United States Patent
Ito et al.

(10) Patent No.: US 6,947,938 B2
(45) Date of Patent: *Sep. 20, 2005

(54) SECURITY METHOD AND SYSTEM FOR STORAGE SUBSYSTEM

(75) Inventors: Ryusuke Ito, Tokyo (JP); Yoshinori Okami, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/737,641

(22) Filed: Dec. 15, 2003

(65) Prior Publication Data

US 2004/0128311 A1 Jul. 1, 2004

Related U.S. Application Data

(63) Continuation of application No. 09/561,404, filed on Apr. 27, 2000, now Pat. No. 6,684,209.

(30) Foreign Application Priority Data

Jan. 14, 2000 (JP) .................................... P2000-010115

(51) Int. Cl.⁷ ............................................. G06F 17/30
(52) U.S. Cl. .............................. 707/9; 707/10; 711/100
(58) Field of Search ............................ 707/100, 9, 10; 709/229, 211, 238; 710/107; 711/152, 100

(56) References Cited

U.S. PATENT DOCUMENTS

| | | |
|---|---|---|
| 4,144,583 A | 3/1979 | Lawson ..................... 711/112 |
| 4,914,656 A | 4/1990 | Dunphy, Jr. et al. ........ 714/710 |
| 4,989,205 A | 1/1991 | Dunphy, Jr. et al. ............ 714/6 |
| 5,077,736 A | 12/1991 | Dunphy, Jr. et al. ............ 714/7 |
| 5,124,987 A | 6/1992 | Milligan et al. ................ 714/7 |
| 5,163,096 A | 11/1992 | Clark et al. ................. 711/164 |
| 5,210,844 A | 5/1993 | Shimura et al. ............. 711/153 |
| 5,237,668 A | 8/1993 | Blandy et al. ................. 711/2 |
| 5,239,632 A | 8/1993 | Larner ........................ 710/314 |
| 5,274,783 A | 12/1993 | House et al. ............... 710/300 |
| 5,282,247 A | 1/1994 | McLean et al. ............. 711/164 |
| 5,297,268 A | 3/1994 | Lee et al. ................... 711/164 |

(Continued)

FOREIGN PATENT DOCUMENTS

| | | |
|---|---|---|
| EP | 0709988 | 5/1996 |
| EP | 0881560 | 12/1998 |
| JP | 1181139 | 7/1989 |

(Continued)

OTHER PUBLICATIONS

Smith et al "Tachyon: a gigabit Fibre Channel Protocol Chip", Hewlett–Packard Journal, vol. 47, No. 5, Oct. 1996, pp. 94–98, internet copy.

(Continued)

*Primary Examiner*—John E. Breene
*Assistant Examiner*—Gwen Liang
(74) *Attorney, Agent, or Firm*—Mattingly, Stanger, Malu & Brundidge, P.C.

(57) ABSTRACT

According to the present invention, techniques for performing security functions in computer storage subsystems in order to prevent illegal access by the host computers according to logical unit (LU) identity are provided. In representative embodiments management tables can be used to disclose the Logical Unit in the storage subsystem to the host computers in accordance with the users operational needs. In a specific embodiment, accessibility to a storage subsystem resource can be decided when an Inquiry Command is received, providing systems and apparatus wherein there is no further need to repeatedly determine accessibility for subsequent accesses to the Logical Unit. Many such embodiments can maintain relatively high performance, while providing robust security for each LU.

37 Claims, 23 Drawing Sheets

| Company_ID (hex) | Virtual LUN | LUN |
|---|---|---|
| 0000E1 | 0  1  2  3 | 0  1  2  3 |
| 0000E2 | 0  1 | 4  5 |
| 0000F0 | 0  1 | 6  7 |
| 000A10 | 0  8  16  24 | 9  10  11  12 |
| ... | ... | ... |
| 000011 | 16 | 20 |

U.S. PATENT DOCUMENTS

| | | | |
|---|---|---|---|
| 5,469,564 A | 11/1995 | Junya | 713/202 |
| 5,528,584 A | 6/1996 | Grant et al. | 370/254 |
| 5,533,125 A | 7/1996 | Bensimon et al. | 711/163 |
| 5,548,783 A | 8/1996 | Jones et al. | 710/16 |
| 5,610,745 A | 3/1997 | Bennett | 398/52 |
| 5,610,746 A | 3/1997 | Ranalli | 398/102 |
| 5,617,425 A | 4/1997 | Anderson | 714/710 |
| 5,623,637 A | 4/1997 | Jones et al. | 711/164 |
| 5,634,111 A | 5/1997 | Oeda et al. | 711/153 |
| 5,644,789 A | 7/1997 | Matthews et al. | 710/36 |
| 5,651,139 A | 7/1997 | Cripe et al. | 711/112 |
| 5,657,445 A | 8/1997 | Pearce | 713/200 |
| 5,663,724 A | 9/1997 | Westby | 341/59 |
| 5,748,924 A | 5/1998 | Llorens et al. | 710/62 |
| 5,768,530 A | 6/1998 | Sandorfi | 709/233 |
| 5,768,623 A | 6/1998 | Judd et al. | 710/37 |
| 5,805,800 A | 9/1998 | Kotani et al. | 713/200 |
| 5,805,920 A | 9/1998 | Sprenkle et al. | 710/1 |
| 5,809,279 A | 9/1998 | Oeda et al. | 711/153 |
| 5,809,328 A | 9/1998 | Nogales et al. | 710/5 |
| 5,812,754 A | 9/1998 | Lui et al. | 714/6 |
| 5,835,496 A | 11/1998 | Yeung et al. | 370/514 |
| 5,848,251 A | 12/1998 | Lomelino et al. | 710/305 |
| 5,872,822 A | 2/1999 | Bennett | 375/372 |
| 5,894,481 A | 4/1999 | Book | 370/412 |
| 5,913,227 A | 6/1999 | Raz et al. | 711/152 |
| 5,941,969 A | 8/1999 | Ram et al. | 710/315 |
| 5,941,972 A | 8/1999 | Hoese et al. | 710/315 |
| 6,006,342 A | 12/1999 | Beardsley et al. | 714/5 |
| 6,041,381 A | 3/2000 | Hoese | 710/315 |
| 6,061,750 A | 5/2000 | Beardsley et al. | 710/74 |
| 6,061,753 A | 5/2000 | Ericson | 710/107 |
| 6,105,092 A | 8/2000 | Oeda et al. | 710/104 |
| 6,118,776 A | 9/2000 | Berman | 370/351 |
| 6,119,121 A | 9/2000 | Zhu | 707/101 |
| 6,185,203 B1 | 2/2001 | Berman | 370/351 |
| 6,195,703 B1 | 2/2001 | Blumenau et al. | 709/238 |
| 6,209,023 B1 | 3/2001 | Dimitroff et al. | 709/211 |
| 6,219,771 B1 | 4/2001 | Kikuchi et al. | 711/164 |
| 6,263,445 B1 | 7/2001 | Blumenau et al. | 713/201 |
| 6,295,575 B1 | 9/2001 | Blumenau et al. | 711/5 |
| 6,343,324 B1 | 1/2002 | Hubis et al. | 709/229 |
| 6,356,979 B1 * | 3/2002 | Sicola et al. | 711/114 |
| 6,389,432 B1 | 5/2002 | Pothapragada et al. | 707/205 |
| 6,421,711 B1 | 7/2002 | Blumenau et al. | 709/213 |
| 6,421,753 B1 | 7/2002 | Hoese | 710/305 |
| 6,425,035 B2 | 7/2002 | Hoese | 710/105 |
| 6,425,036 B2 | 7/2002 | Hoese | 710/62 |
| 6,438,648 B1 * | 8/2002 | McKean et al. | 711/114 |
| 6,446,141 B1 | 9/2002 | Nolan et al. | 710/8 |
| 6,484,229 B1 | 11/2002 | Ichikawa et al. | 711/4 |
| 6,484,245 B1 | 11/2002 | Sanada et al. | 711/164 |
| 6,493,347 B2 | 12/2002 | Sindhu et al. | 370/401 |
| 6,499,075 B2 | 12/2002 | Oeda et al. | 710/104 |
| 6,502,162 B2 | 12/2002 | Blumenau et al. | 711/5 |
| 6,523,096 B2 | 2/2003 | Sanada et al. | 711/152 |
| 6,538,669 B1 | 3/2003 | Lagueux, Jr. et al. | 345/764 |
| 6,553,408 B1 | 4/2003 | Merrell et al. | 709/213 |
| 6,571,354 B1 | 5/2003 | Parks et al. | 714/7 |
| 6,574,667 B1 | 6/2003 | Blumenau | 709/229 |
| 6,598,174 B1 | 7/2003 | Parks et al. | 714/6 |
| 6,606,695 B2 | 8/2003 | Kamano et al. | 711/163 |
| 6,609,180 B2 | 8/2003 | Sanada et al. | 711/152 |
| 6,633,962 B1 | 10/2003 | Burton et al. | 711/163 |
| 6,640,278 B1 | 10/2003 | Nolan et al. | 711/6 |
| 6,643,748 B1 | 11/2003 | Wieland | 711/152 |
| 6,654,830 B1 | 11/2003 | Taylor et al. | 710/74 |
| 6,665,714 B1 | 12/2003 | Blumenau et al. | 709/222 |
| 6,684,209 B1 | 1/2004 | Ito et al. | 707/9 |
| 2001/0020254 A1 | 9/2001 | Blumenau et al. | 709/229 |

FOREIGN PATENT DOCUMENTS

| | | |
|---|---|---|
| JP | 3105419 | 5/1991 |
| JP | 3152650 | 6/1991 |
| JP | 5128030 | 5/1993 |
| JP | 5181609 | 7/1993 |
| JP | 5225068 | 9/1993 |
| JP | 5324445 | 12/1993 |
| JP | 6095859 | 4/1994 |
| JP | 6214863 | 8/1994 |
| JP | 8115279 | 5/1996 |
| JP | 63253448 | 10/1998 |
| JP | 0333839 | 12/1998 |

OTHER PUBLICATIONS

Gibson et al, "A Case for Network–Attached Secure Disks", Document CMU–CS–96–142, School of Computer Science, Carnegie Mellon University, Sep. 26, 1996, pp. 1–19.

Gibson et al "File Server Scaling with Network–Attached Secure Disks" Proceedings of the 1997 ACM Sigmetrics International Conference on Measurement & Modeling of Computer Systems, Jun. 1997, pp. 272–284.

Van Meter III, "A Brief Survey of Current Work on Network Attached Peripherals", ACM SIGOPS, Operating Systems Review, v. 30, n. 1, Jan. 1996, pp. 63–70, Internet copy.

Performance Efficient Multiple Logical Unit Number Mapping for Redundant Array of Independent Disks, IBM Technical Disclosure Bulletin, May 1996, pp. 273–274.

J. Wilkes, et al "The HP AutoRAID Hierarchical Storage System", ACM Transactions on Computer Systems, vol. 14, No. 1, Feb. 1996, pp. 108–136.

E. Lee, et al, Petal: Distributed Virtual Disks, Proceedings of the $7^{th}$ int'l Conf. On Architectural Support for Programming Languages and Operating Systems, ASPLOS VII, ACM, 1996, pp. 84–92.

* cited by examiner

FIG.9

| | WWN | LUN |
|---|---|---|
| 902 | 01234567 89ABCDEF | 0 1 2 |
| 903 | 01234567 89ABCDEE | 3 4 7 |
| 904 | 01234567 89ABCDED | 5 6 |
| | ... ... ... | ... ... ... |
| | ... ... | ... ... |

901

| WWN | LUN |
|---|---|
| 01234567 89ABCDBB | 0  1  7 |
| 01234567 89ABCDB0 | 3  5  6 |
| 01234567 89ABCDB1 | 2  4 |

| WWN | LUN |
|---|---|
| 01234567 89ABCDAA | 0 1 2 3 4 5 |
| 01234567 89ABCDA0 | 6 7 8 9 10 |
| 01234567 89ABCDA1 | 11 12 13 14 15 |

| WWN | Virtual LUN | LUN |
|---|---|---|
| 01234567 89ABCDEF | 0 1 2 3 | 0 1 2 3 |
| 01234567 89ABCDEE | 0 1 | 4 5 |
| 01234567 89ABCDED | 0 1 | 6 7 |
| 01234567 89ABCDEC | 0 8 16 24 | 9 10 11 12 |
| ... | ... | ... |
| 01234567 89ABCDCC | 16 | 20 |
| ... | ... | ... |
| ... | ... | ... |
| 01234567 89ABCDBB | 0 1 3 5 7 | 30 31 32 33 34 |
| 01234567 89ABCDAA | 0 2 4 6 | 35 36 37 38 |
| ... | ... | ... |
| 01234567 89ABCD10 | 4 | 39 |
| ... | ... | ... |
| 01234567 89ABCD2E | 0 1 2 3 4 5 | 10 11 12 13 14 15 |
| 01234567 89ABCD2F | 0 1 2 3 4 5 | 10 11 12 13 14 15 |
| ... | ... | ... |
| 01234567 89ABCD31 | 0 1 2 3 4 5 6 7 | 8 9 10 11 12 13 14 15 |
| 01234567 89ABCD32 | 8 9 10 11 12 13 14 15 | 8 9 10 11 12 13 14 15 |
| ... | ... | ... |
| 01234567 89ABCD4E | 0 1 2 3 | 4 8 12 16 |

| WWN | Virtual LUN | LUN |
|---|---|---|
| 01234567 89ABCDCC | 0 1 2 3 4 | 0 1 6 8 15 |
| 01234567 89ABCDC0 | 0 1 2 | 2 7 10 |
| 01234567 89ABCDC1 | 0 1 2 3 | 3 4 5 14 |
| ... | ... | ... |

1502 — WWN
1501 — (row marker)
1503 — Virtual LUN
1504 — LUN
1505, 1506, 1507 — row labels

| S_ID | WWN |
|---|---|
| FFFF01 | 01234567 89ABCDEF |
| FFFF02 | 01234567 89ABCDEE |
| FFFF03 | 01234567 89ABCDED |
| .. | .. |

| 0101 (4 bit) | Company_ID (24 bit) | VSID Vendor Specific Identifier (36 bit) |

2202 — 2201 — 2203 — 2204

63    60                    36                                    0

| Company_ID (hex) | Virtual LUN | LUN |
|---|---|---|
| 0000E1 | 0 1 2 3 | 0 1 2 3 |
| 0000E2 | 0 1 | 4 5 |
| 0000F0 | 0 1 | 6 7 |
| 000A10 | 0 8 16 24 | 9 10 11 12 |
| ... | ... | ... |
| 000011 | 16 | 20 |

2302 — 2301 — 2303 — 2304

| Company ID (hex) | Virtual LUN | LUN |
|---|---|---|
| 0000E1 | 0 1 2 3 4 | 0 1 6 8 15 |
| 0000E2 | 0 1 2 | 2 7 10 |
| 0000F0 | 0 1 2 3 | 3 4 5 14 |
| ... | ... | ... |

SECURITY METHOD AND SYSTEM FOR STORAGE SUBSYSTEM

CROSS-REFERENCES TO RELATED APPLICATION

This application is a continuation of U.S. patent application Ser. No. 09/561,404, filed Apr. 27, 2000, now U.S. Pat. No. 6,684,209, which claims priority from Japanese Patent Application Reference No. P00-010115, filed on Jan. 14, 2000, and is related to co-pending application Ser. No. 10/737,477, filed Dec. 15, 2003, the entire contents of all of which are incorporated herein by reference for all purposes.

PAPER APPENDIX

An attached paper appendix, comprising 13 pages, is attached hereinafter and incorporated herein for all purposes.

BACKGROUND OF THE INVENTION

The present invention relates generally to storage subsystems, and in particular to techniques for providing access to Logical Units within a storage subsystem by host computers.

Conventionally, security methodologies designed to prevent an illegal access to a storage subsystem by host computers depend on the functions of OS (Operating System), middleware or application software on the host side.

On the other hand, as the fiber channel protocol has been standardized in recent years, the various standard protocols such as SCSI, ESCON, and TCP/IP have become available to be used as the interface between the host computers and the storage subsystem, resulting in more and more efficient use of the storage resources within the storage subsystem.

However, because more than one host computer accesses one storage subsystem, the traditional security approaches that depend on operating system (OS), middleware, or application software on the host computer side, are increasingly recognized as providing insufficient security for the resources in modem storage subsystems.

What is really needed are techniques for performing security functions in computer storage subsystems connected to one or more host computers via high performance channel interfaces.

SUMMARY OF THE INVENTION

According to the present invention, techniques for performing security functions in computer storage subsystems in order to prevent illegal access by the host computers according to logical unit (LU) identity are provided. In representative embodiments management tables can be used to disclose the Logical Unit in the storage subsystem to the host computers in accordance with the users operational needs. In a specific embodiment, accessibility to a storage subsystem resource can be decided when an Inquiry Command is received, providing systems and apparatus wherein there is no further need to repeatedly determine accessibility for subsequent accesses to the Logical Unit. Many such embodiments can maintain relatively high performance, while providing robust security for each Logical Unit.

In a representative embodiment according to the present invention, a computer system is provided. The computer system can comprise a variety of components, such as one or more host computers and one or more storage subsystems. Each storage subsystem can comprise one or more logical units, for example. A data channel can interconnect the host computers with the storage subsystem. The host computers can request availability of one or more of the logical unit in one of the storage subsystems. Such request can comprise identity information corresponding to the particular host computer, and a virtual logical unit identifier of the logical unit, the availability of which is being requested. In response, the storage subsystem determines whether the requesting host computer may permissibly access the logical unit requested based upon the virtual logical unit identifier and the identity information from the request.

In specific embodiments of the computer system, identity information corresponding to the one or more host computers further comprises a dynamically assignable identifier. The storage subsystem determines a unique identifier for the one or more host computers from the identity information in the request; and then determines whether the host computer requesting access may permissibly access the logical unit based upon the virtual logical unit identifier and the unique identifier.

In another representative embodiment according to the present invention, a storage subsystem is provided. The storage subsystem can comprise a management table that defines relationships among the information WWN which uniquely identifies the accessing host computer, a Logical Unit Number (LUN) in the storage subsystem which the host computer is permitted to access, and a Virtual Logical Unit Number (Virtual LUN) which is created from the LUN identifiers in any way of numbering in accordance with user's convenience. Specific embodiments can also include a management table that defines the linkages between a Management Number (S_ID) dynamically assigned by the storage subsystem to identify a host computer, and a World Wide Name (WWN) which uniquely identifies the accessing host computer. The management tables can be stored in a non volatile memory, for example. Some specific embodiments can comprise more than one storage unit, and the like. A storage control unit to control the read/write operations from/to said storage units can also be part of the storage subsystem. Specific embodiments can also include more than one communication port to connect to a plurality of host computers, and Logical Units corresponding to the storage areas in said storage units.

In a specific embodiment according to the present invention, in the storage subsystem, the assigned S_ID is used as an identity information of the host computer instead of the WWN. Such embodiments do not require checking the accessibility to the LUN each time an I/O operation is executed, resulting in less overhead in each I/O operation. Also, users are free to rearrange LUNs in any desired way by making use of the Virtual LUNs.

In a further representative embodiment according to the present invention, the storage subsystem retrieves an identity information, such as the Company_ID, that is common to a certain group of host computers, partially from the WWN. By performing the accessibility control on the basis of the group having the common identity information, the storage subsystem provides the host computer with storage resource format, application, service, and specific pressing valid only for that particular host computer group.

Numerous benefits are achieved by way of the present invention over conventional techniques. The present invention can provide the security functions that prevent illegal accesses by limiting accessibility of Logical Units by each host computer, without additional modification of the current operation of the host computer. Many embodiments can also provide the security function to prevent illegal accesses by limiting accessible Logical Units according to each vendor of the host computers, without additional modification of the current operation on the host computer side. Further, select embodiments according to the present invention can provide permission to access storage resources based on security functions to host computer groups. Such permission can be according to vendor, and service can be specifically tailored for the group. Specific embodiments can provide highly efficient use of the storage resources and fast accessibility judgment logic.

These and other benefits are described throughout the present specification. A further understanding of the nature and advantages of the invention herein may be realized by reference to the remaining portions of the specification and the attached drawings.

BRIEF DESCRIPTION OF THE DRAWINGS

FIG. 9 illustrates an "LUN Access Management Table" in a particular embodiment of the present invention;

FIG. 14 illustrates a representative format of a "LUN Access Management Table" in a particular embodiment of the present invention;

FIG. 19 illustrates a representative format for a "WWN-S_ID Conversion Table" in a particular embodiment of the present invention;

DESCRIPTION OF THE SPECIFIC EMBODIMENTS

Figure 1:
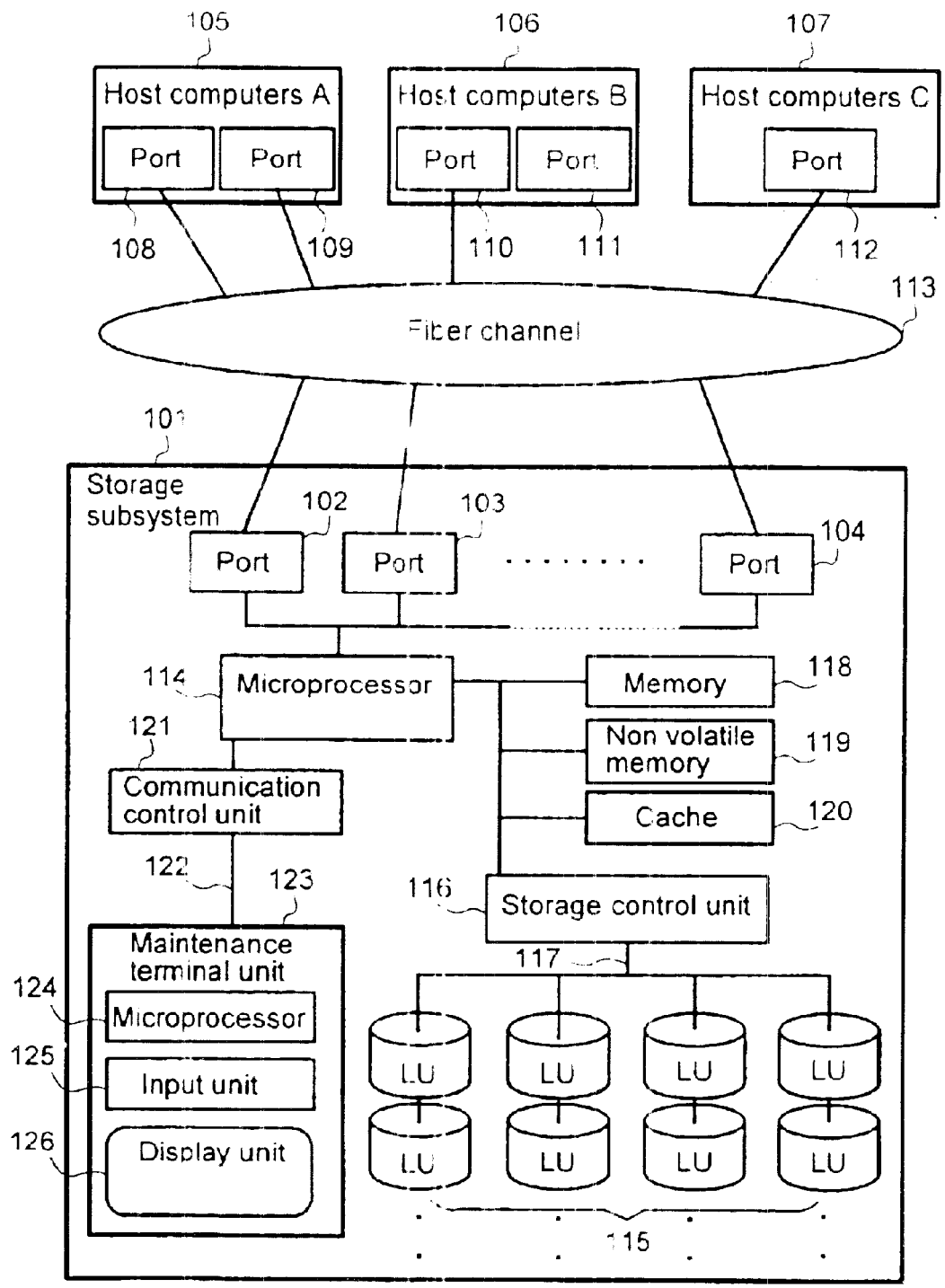
FIG. 1 illustrates a representative hardware configuration in which the present invention may be readily embodied.

The present invention provides techniques for performing security functions in computer storage subsystems in order to prevent illegal access by the host computers according to logical unit (LU) identity. In representative embodiments management tables can be used to disclose the Logical Unit in the storage subsystem to the host computers in accordance with the users operational needs. In a specific embodiment, accessibility to a storage subsystem resource can be decided when an Inquiry Command is received, providing systems and apparatus wherein there is no further need to repeatedly determine accessibility for subsequent accesses to the Logical Unit. Many such embodiments can maintain relatively high performance, while providing robust security for each Logical Unit.

According to one example of storage subsystem access security, before the host computer is started, the storage subsystem establishes a table which manages the combination of an accessible Logical Unit in the storage subsystem and N_Port_Name. The N_Port_Name uniquely identifies the host computer which may access the storage subsystem. When the host computer is started, it issues a SCSI command consisting of an information unit called a frame which is specified by the fiber channel protocols. The storage subsystem checks details each time this SCSI command is received and extracts the N_Port_Name which identifies the accessing host computer.

The extracted N_Port_Name is searched for in a combination table of the Logical Units and said N_Port_Names, and when an expected entry exists, the host computer is permitted to access the Logical Unit. Otherwise, when no associated entry exists, the host computer is refused access to the Logical Unit. For a detailed description of one example of a security means for a storage subsystem resource (the Logical Unit), reference may be had to a Japanese unexamined patent application, publication 10-333839, the entire contents of which are incorporated herein by reference for all purposes.

The present invention is explained with reference to specific embodiments employing a fiber channel as an interface protocol between a storage subsystem and host computers, and the SCSI command set as a command interface operational under the interface protocol, as examples. However, the application of the present invention is not limited to the combination of the fiber channel and SCSI command set. Any protocol which provides similar function and structure of LOGIN, Inquiry, and the like may apply techniques according to the present invention.

In a representative embodiment according to the present invention, a fiber channel protocol is employed as an interface between storage subsystem and one or more host computers. Because the fiber channel is a relatively new interface protocol, details of a representative embodiment employing fiber channel protocol will be outlined herein.

The fiber channel protocol utilizes serial type of data transfer and can make use of the band width of the transmission medium effectively because of the asynchronous transfer method. The fiber channel doesn't have its own command set and instead adopts the command sets such as the SCSI, ESCON, HIPPI, IPI-3, IP and so on, as its command set infrastructure. Therefore, it is possible to inherit the traditional protocol resources and to realize faster, more reliable, and versatile data transfer.

The fiber channel is an interface having characteristics of both of so called Channel Interface and Network Protocols. In the fiber channel, once the transferring unit and receiving unit are fixed, high speed data transferring is available with the least transferring delay. This feature can provide a desirable data transfer rates in specific embodiments using such channel interfaces.

Also, any unit who wants communication can enter into a communication over the network on any optional occasion and can initiate the communication by exchanging agreement information about communication conditions with another unit. These are some of the characteristics of such networks. The procedure to reach agreement about the communication condition with another unit, as described above, is specifically called LOGIN.

A unit that interfaces with the fiber channel is called a node and a physical entrance of the node, that is, the actual interface, is called a port. A node can have one or more ports. The number of the ports which can participate simultaneously in the whole system of the fiber channel is defined by the number of 24-bit addresses, i.e. about 16,770,000 maximum in a particular embodiment. The hardware which mediates these connections is called fabric. Actually, however, both transferring and receiving ports are not required to be aware of the fabric, they are need only operate according to the information exchanged with each other.

The identifier, which is unique all over the world, is allocated based on a consistent rule by the standardization group (IEEE), and is maintained in each node and port. This identifier is equivalent to the MAC address traditionally used in the TCP/IP and so on and the address information is fixed by hardware. This address comprises of two components of N_Port_Name and Node_Name, and each has a size of 8 bytes respectively, in a representative embodiment. The N_Port_Name is a specific value (the hardware address) corresponding to each port and the Node_Name is also a specific value (the hardware address) corresponding to each node. Because each of them is an unique value all over the world and can address a port or a node uniquely, it is called WWN (World Wide Name). In specific embodiments of the present invention, when the WWN is referred to, it means the N_Port_Name.

Figure 2:
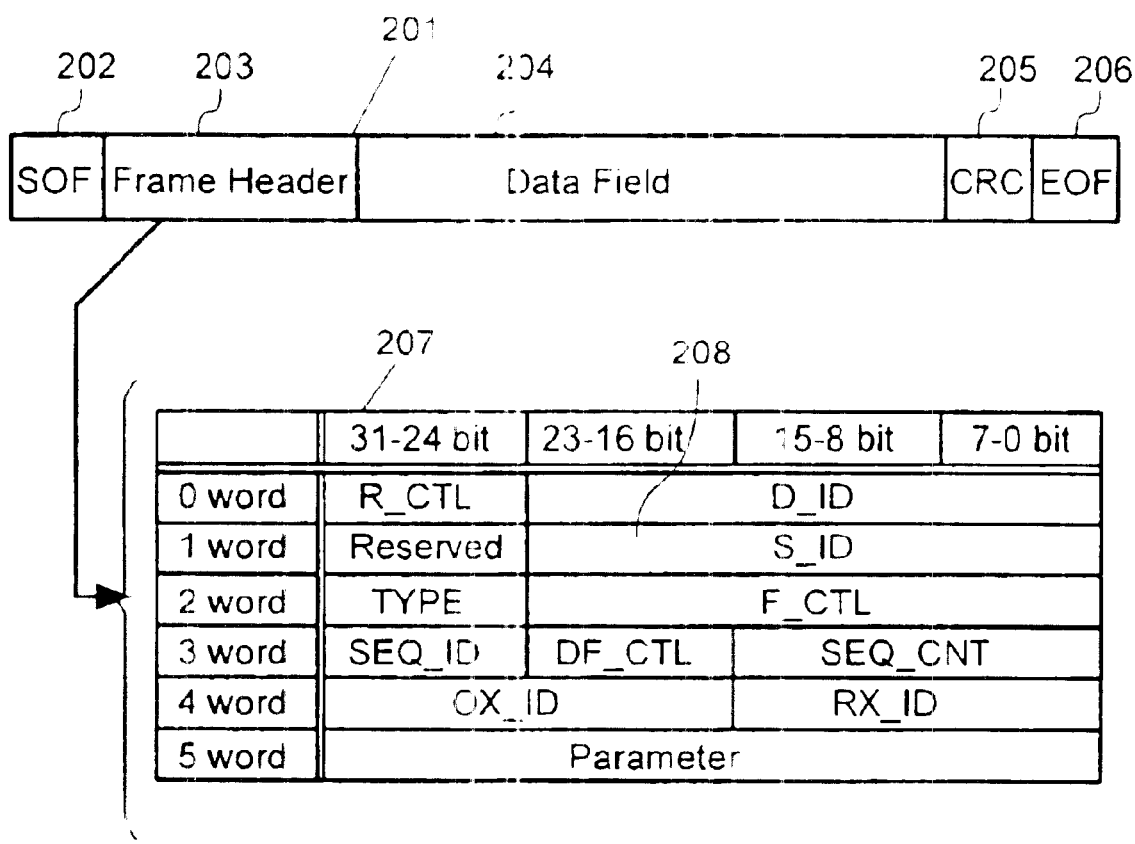
FIG. 2 illustrates a representative Frame Format and Frame Header in a particular embodiment of the present invention.

In the fiber channel, a communication is executed by exchanging a signal level information called an Ordered Set and a logical information having fixed format called a frame. FIG. 2 shows a representative structure of a frame. A frame block 201 comprises of, an SOF (Start of Frame) 202 of 4 bytes, for example, which indicates a start of the frame, a Frame Header 203 of 24 bytes, for example, which controls Link Operation and characterizes the frame, a Data Field 204 which contains the actual data to be transferred, a Cyclic Redundancy Code (CRC) 205 of 4 bytes, for example, and an EOF (End of Frame) 206 of 4 bytes, for example, which indicates the end of the frame. The length of the Data Field 204 is variable between 0–2112 bytes, for example.

Next, the contents of the Frame Header are explained. Table 207 illustrates the structure of a representative Frame Header. Here, an S_ID 208, which comprises the 0 bit to 23 bit area of the first word of the detailed structure 207 in the Frame Header 203, is explained. The S_ID (Source ID) 208 is the address of 3 bytes, for example, that identify the port which transfers the frame, and has a value effective within all frames sent and received. This S_ID is a dynamically assigned value and is specified to be allocated by the fabric during the initialization procedure in the case of FC_PH, which is one of the standard sets of the fiber channel. The allocated value depends on the N_Port_Name or Node_Name which each port has.

Figure 3:
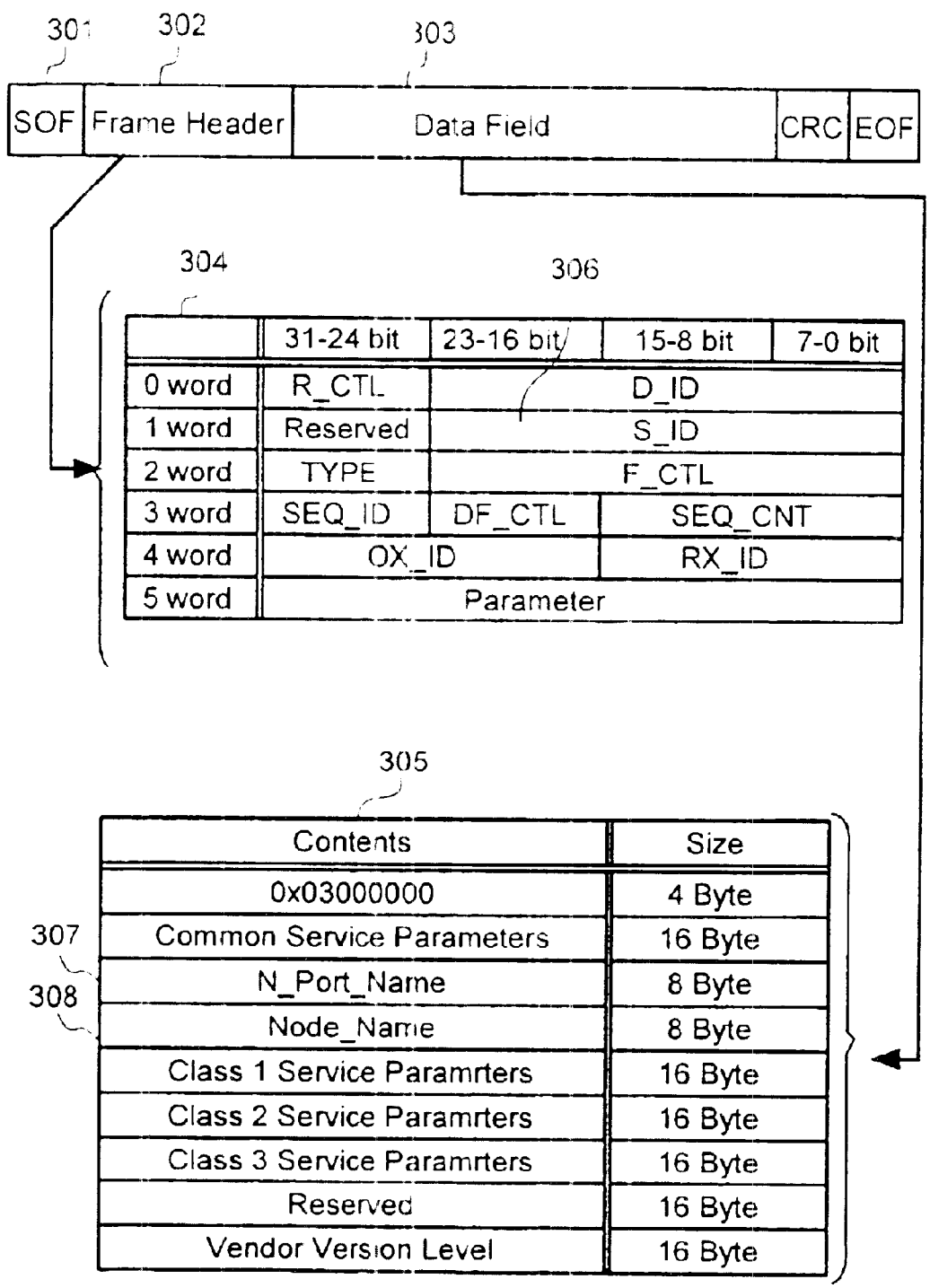
FIG. 3 illustrates the Frame Format, Frame Header and a Data Field in a particular embodiment of the present invention.

Next, the LOGIN procedure, with which the transferring unit and receiving unit exchange information about the communication with each other based on the fiber channel protocol, is explained. FIG. 3 shows the detailed structure of a representative Data Field 303 of a PLOGI frame. The structures of the frame and Frame Header are the same as that of FIG. 2. Among the Data Field 303 of the PLOGI frame, the 8-byte area from the 21st byte to the 29th byte stores the N_Port_Name 307 and the 8-byte area from the 30th byte to the 38th byte stores the Node_Name 308, for example.

Figure 4:
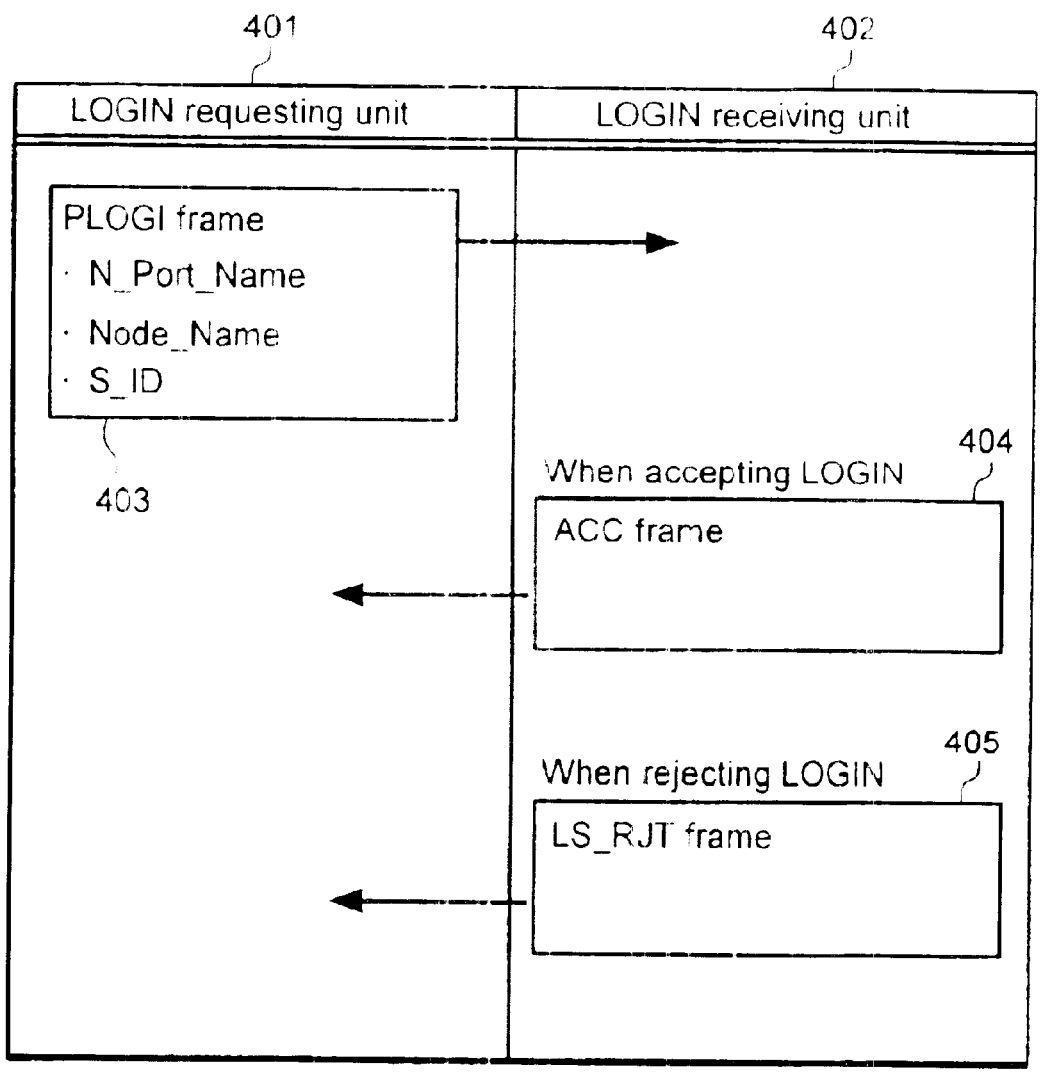
FIG. 4 illustrates a representative LOGIN process in a particular embodiment of the present invention.

FIG. 4 shows an exchange of the information between a transferring unit (LOGIN requesting unit) 401 and a receiving unit (LOGIN receiving unit) 402. Several kinds of LOGIN procedures exist in the fiber channel, however, the Class 3 LOGIN procedure is described here as an example.

A LOGIN requesting unit transfers the PLOGI frame 403 to a LOGIN receiving unit. In this frame are included the N_Port_Name, Node_Name, S_ID and the other information belonging to the LOGIN requesting unit. The LOGIN receiving unit transfers a frame which is called ACC 404 to the LOGIN requesting unit, if the receiving unit accepts the LOGIN after checking the information contained in the frame. On the other hand, if the LOGIN is rejected, the receiving unit transfers a frame which is called LS_RJT 405 to the LOGIN requesting unit.

When the LOGIN requesting unit receives the ACC frame as a response to the PLOGI frame transferred by itself, it understands that the LOGIN has succeeded and it is placed in the status ready for initiating the I/O process for the data transfer and so on. On the other hand, when it receives LS_RJT, the LOGIN has not succeeded and the LOGIN requesting unit may not proceed to I/O process with the LOGIN receiving unit. Here, the LOGIN process of Class 3 is explained, but regarding the other LOGIN processes, it is similar in that the N_Port_Name, Node_Name and S_ID are contained in the information can be transferred to the LOGIN receiving unit from the LOGIN requesting unit.

Next, an Inquiry Command, which is supported as a standard command in the SCSI command set, is explained. Preceding the initiation of I/O process, the Inquiry Command is used to inquire the status of a Logical Unit to be an object of the succeeding I/O process, such as installation status or ready status.

Figure 5:
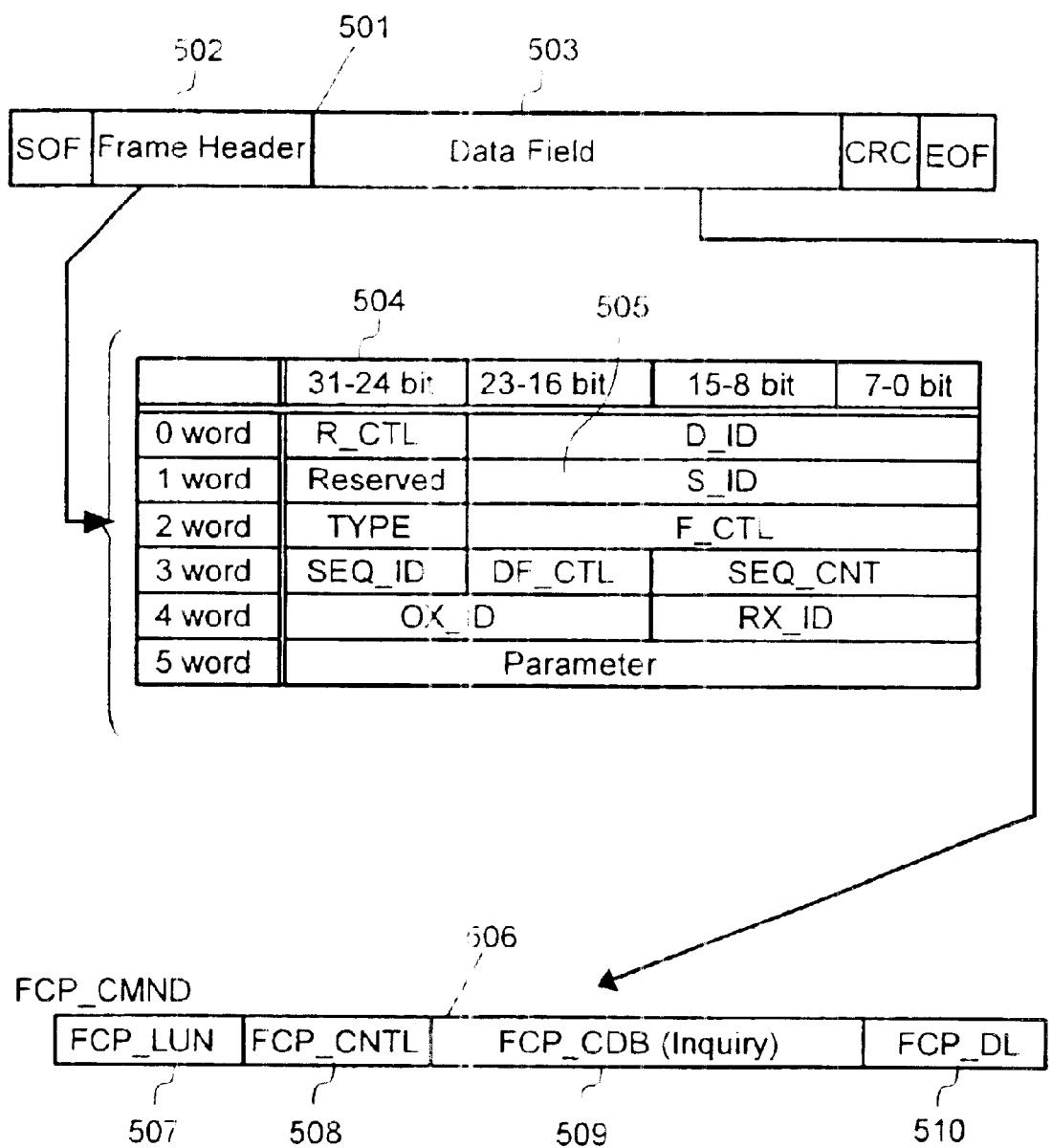
FIG. 5 illustrates a representative Frame format for transmitting an Inquiry Command in a particular embodiment of the present invention.

FIG. 5 shows a detailed diagram of a representative structure of the Data Field used when the Inquiry Command specified by the SCSI standard is transferred using a frame specified by the fiber channel standard. The structures of the frame and Frame Header are similar to those shown in FIG. 2, however, included in the Data Field is the S_ID 505 for the LOGIN requesting unit stored by the LOGIN receiving unit during the preceding PLOGI sequence before this frame is transferred.

In the data field 503, there is an area called FCP_LUN 507, FCP_CNTL 508, FCP_CDB 509, and FCP_DL 510 as shown in the FCP_CMND format 506. FCP_LUN 507, and FCP_CDB 509 will be described hereafter. The identifier of the logical volume is contained in FCP_LUN 507. The logical volume is related to a port that receives a frame, and also, the status of such logical volume is requested to be sent to a node which sends a frame. (Here, logical volume is a virtual area which is divided in plural areas, and is given numbers (In contrast to physical volume).) This identifier is called LUN (Logical Unit Numbers). In case if SCSI command set is utilized, a command information called "command description block (CDB)" is contained in FCP_CDB 509. The Inquiry command information of SCSI will be contained in FCP_CDB 509, and will be transferred (together with FCP_LUN 507) to a node that receives a frame.

Figure 6:
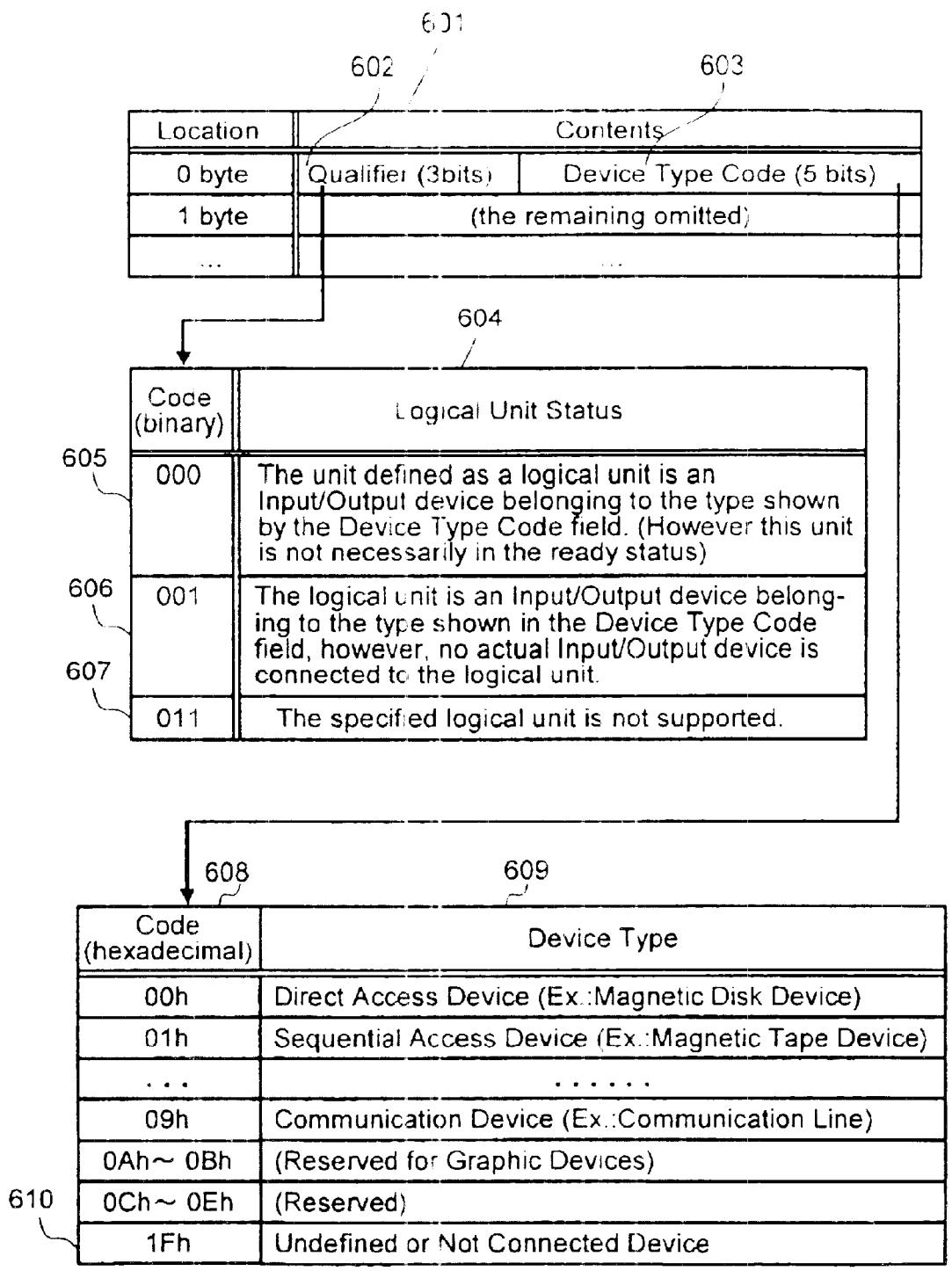
FIG. 6 illustrates a representative format for Inquiry Data used when transferring Inquiry Data responsive to the Inquiry Command which is shown in FIG. 5.

Next, the information transferred, as a response to the Inquiry Command, to the frame transmitting unit, from the unit which has received the Inquiry Command is explained. This information is called Inquiry Data. FIG. 6 shows a portion of the Inquiry Data. Here, two of the Inquiry Data 601, the Qualifier 602 and Device Type Code 603 are explained. The Qualifier (Peripheral Qualifier) 602 is 3-bit, for example, information block which sets the current status of the specified Logical Unit. The Logical Unit status 604 indicates the status of the Logical Unit shown by the bit pattern of this Qualifier. The code 000 (binary) 605 indicates that the unit connected as the logical unit is an Input/Output device belonging to the type of unit defined by the Device Type Code field 603. However, even if this code is set, this unit is not necessarily usable, that is, ready to use.

However, if the specified Logical Unit can be used, a code 605 of 000 is set. The code 001 (binary) 606 indicates that the unit being connected as a logical unit is an Input/Output device belonging to the type of unit defined by the Device Type Code field 603. However, no actual Input/Output device is connected to the logical unit. An example of this case is that although a CD-ROM drive is installed but the CD-ROM medium is not inserted into the drive.

The code 011 (binary) 607 indicates that the specified Logical Unit is not supported. Therefore, no device is assigned to the specified Logical Unit. When this code is set, 1F (hexadecimal) is always set in the Device Type Code field 603.

Device Type Code (Peripheral Device Type) 603 comprises 5-bits information, for example, which indicates the type of the Input/Output device which is actually allocated to the specified Logical Unit. The Code 608 is the code of the hexadecimal number which corresponds to each Device Type 609. If the Code 1F (hexadecimal) 610 which indicates an undefined or not connected device is set among the information included in 608, the device inquired by the Inquiry Command transferring unit is undefined or not connected and therefore, the logical unit will not be used by the transferring unit.

Figure 7:
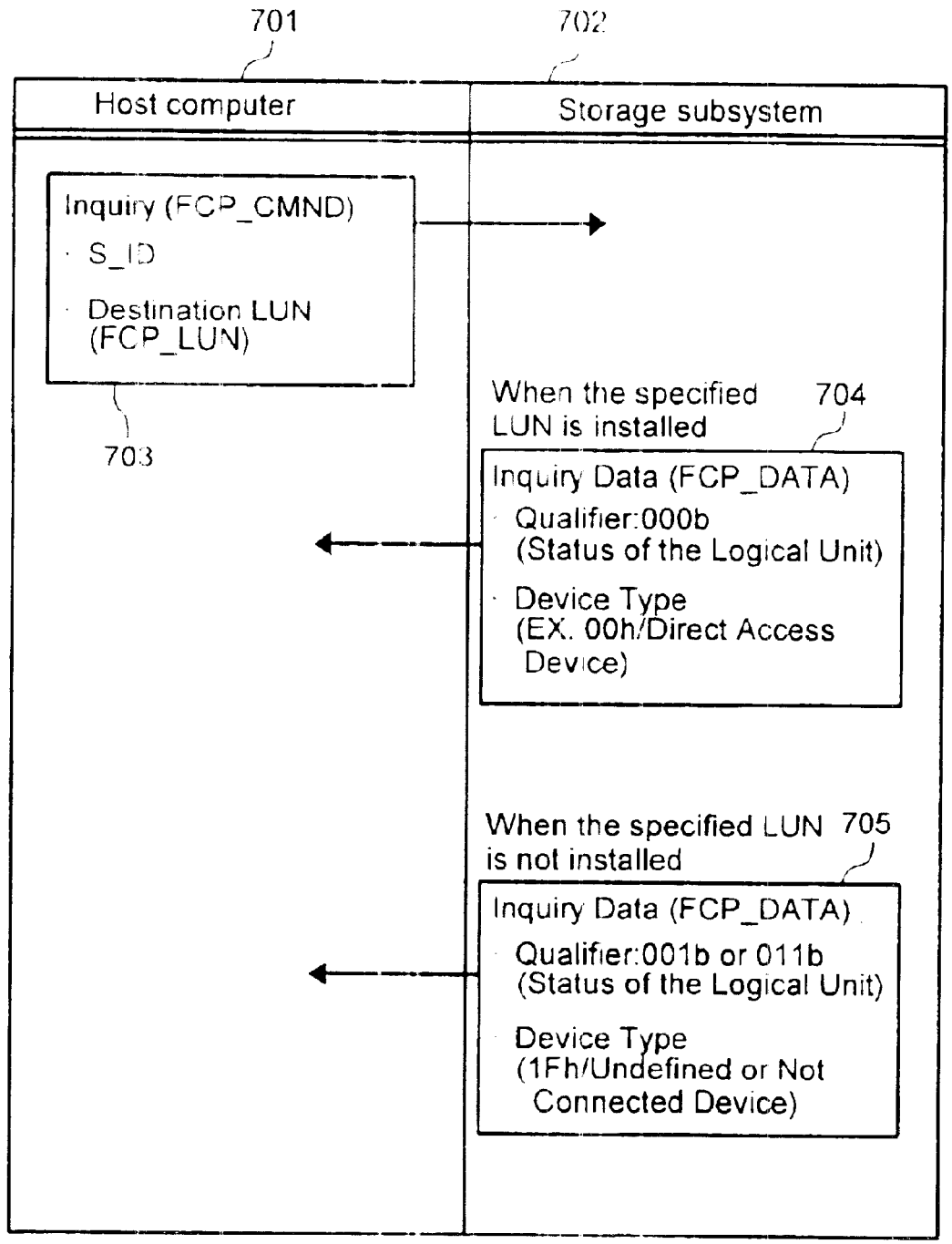
FIG. 7 illustrates a representative sequence for inquiring about the accessibility of a Logical Unit using an Inquiry Command in a particular embodiment of the present invention.

FIG. 7 shows a representative procedure to query a Logical Unit using this Inquiry Command. The host computer 701 which attempts to access a Logical Unit transfers a frame 703 storing the Inquiry Command to the storage subsystem 702 which has the Logical Unit to be accessed.

In this frame, contained are the S_ID of the host computer which has been assigned in the PLOGI sequence and the LUN which is the identifier of the Logical Unit to be queried. Here, as for the LUN, it may be also set in the format of the Inquiry Command information in the FCP_CDB in addition to the FCP_LUN area. The result is the same in either case, however, in this example embodiment, the value of LUN stored in the FCP_LUN 507 is assumed to be used.

The storage subsystem 702 which received the frame containing the Inquiry Command, prepares the required Inquiry Data for the received inquiry and transfers a frame 704 containing the prepared Inquiry Data to the host computer. The frame storing the Inquiry Data at this time is called FCP_DATA. When the host computer received the frame 704 having either the Qualifier 000 (binary) or Device Type in the range of 00–09 (hexadecimal) set by the storage subsystem regarding the queried Logical Unit, it may issue I/O Commands thereafter to the Logical Unit.

On the other hand, if the host computer received a frame 705 having the Qualifier 001 (binary) or 011 (binary) and Device Type 1F (hexadecimal) set by the storage subsystem, it recognizes that no I/O operation may be issued thereafter to the Logical Unit.

From the above, it is understood that a storage subsystem can manage, by itself, whether to accept or reject each access from a host computer to a specified Logical Unit of the storage subsystem by controlling the Qualifier and Device Type Code to be stored in the Inquiry Data. Next, details of the flow of processing in a representative embodiment according to the present invention will be explained.

FIG. 1 shows a subsystem configuration in which the present invention may be embodied. This subsystem is called storage subsystem 101. The storage subsystem 101 has ports 102–104 for the fiber channel interface and it is physically connected with host computers 105–107 via the fiber channel interface. The host computers 105–107, also, have ports 108–112 for the fiber channel interface, and the host computers 105–107 and a storage subsystem 101 can communicate with each other according to the fiber channel protocol. The host computer may have more than one fiber channel ports like 105 or 106, or may have only one fiber channel port like 107.

Although, to connect a storage subsystem 101 and the host computers 105–107, there exist some connection forms (Topology) of the fiber channel interface such as Point-to-Point connection, Arbitrated Loop Connection and Fabric Connection, the present invention will be explained simply referring to as the word 'fiber channel' 113, because the present invention does not depend on a specific Topology.

First, a storage subsystem 101 has microprocessors 114 to perform various calculation and processing, more than two storage unit groups 115, a storage control unit 116 to control the read/write operation from/to these storage units, a bus 117 to connect the storage unit groups 115 and the storage control unit 116. Also, the storage subsystem 101 has a memory unit 118 to be used as the work area of various calculation and processing and a non volatile memory unit 119 which preserves various management information or management tables and so on. Moreover, the subsystem has a cache memory unit 120 to enhance the response time to the host computers. Also, the storage subsystem 101 has a communication control unit 121 and is connected with a maintenance terminal unit 123 via a communication line 122.

The maintenance terminal unit 123 has a microprocessor 124 and an input unit 125 as an interface with users and a display unit 126 to display the results of processing. The users can build some tables defined by this embodiment utilizing this input unit 125.

Figure 8:
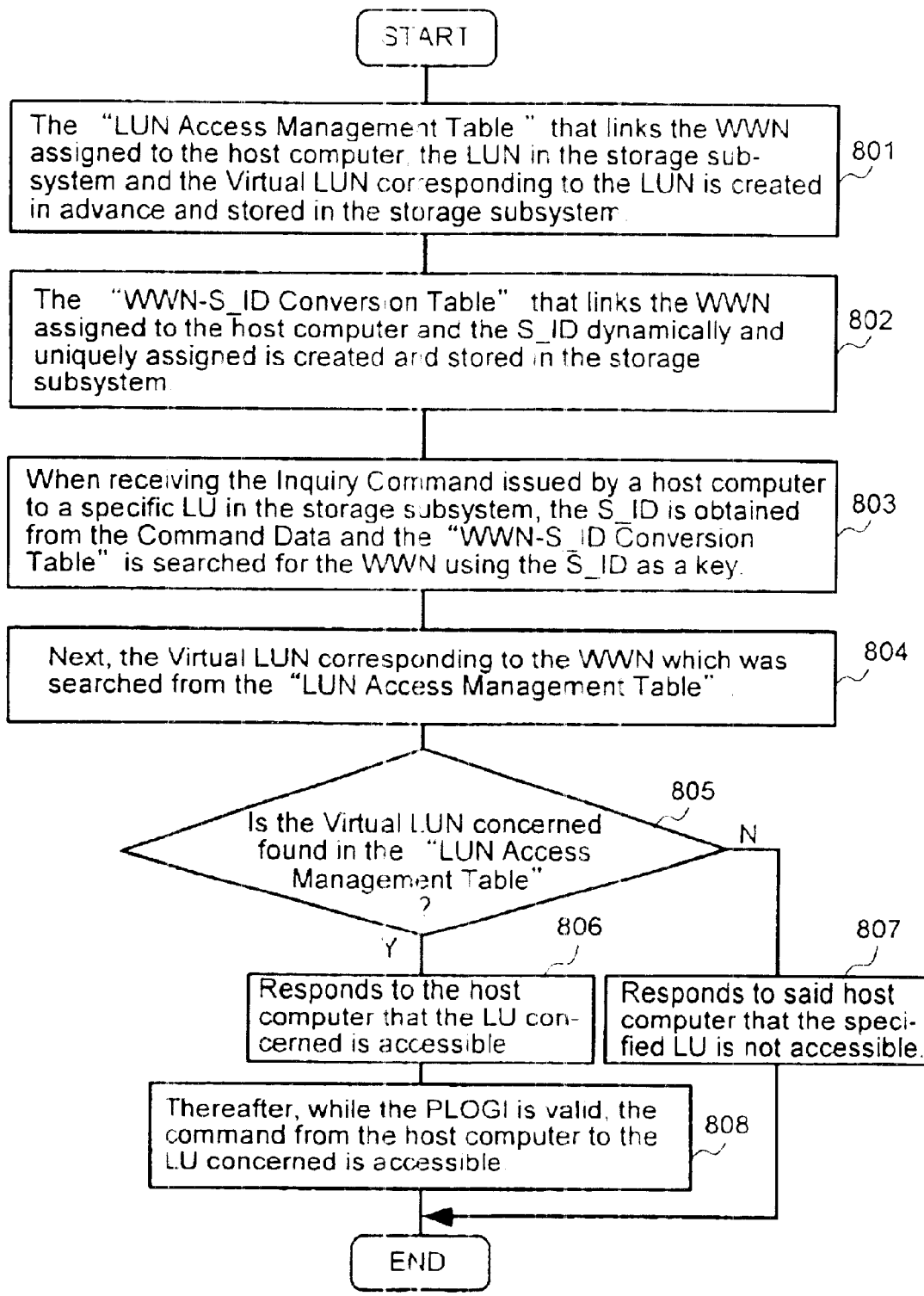
FIG. 8 illustrates an outline of a representative processing sequence for the LUN Security in a particular embodiment of the present invention.

FIG. 8 shows an outline of processing flow in a specific embodiment according to the present invention. FIG. 8 illustrates a step 801, in which the user creates an "LUN Access Management Table" which includes the linkage information combining an LUN (Logical Unit Number) to identify an LU that exists in the storage subsystem, the WWN (N_Port_Name) allocated to the host computer which may access the LUN, and the Virtual LUN to decide how to show the LUN to the host computer using the input unit 125 within the maintenance terminal. This table is maintained in the non volatile memory 119, for example, in the storage subsystem. This Virtual LUN in this table is disclosed to each host computer. The WWN of each host computer is known.

Next, in step 802, when each host computer initiates a LOGIN procedure to the storage subsystem according to the fiber channel protocol, the storage subsystem extracts the WWN and S_ID allocated to the host computer from the PLOGI frame, and creates the "WWN-S_ID Conversion Table," which contains the combination of the WWN and S_ID, and stores this table in the non volatile memory 119. The storage subsystem does this work for all received PLOGI frames.

Next, in step 803, the storage subsystem receives a frame which contains the Inquiry Command transferred by the host computer to get the status of the Logical Unit in the storage subsystem. The storage subsystem that received this frame extracts the S_ID from the header of the frame and the LUN which is to be a target of the Inquiry Command from the Data Field. Next, the storage subsystem searches the "WWN-S_ID Conversion Table" using the S_ID as a key and obtains the WWN corresponding to this S_ID as a key.

Next, in step 804, the storage subsystem searches the "LUN Access Management Table" using the WWN obtained as a key and obtains the Virtual LUN corresponding to the LUN that is a target of the Inquiry Command from the "LUN Access Management Table". The reason why the storage subsystem obtains the LUN that is a target of the Inquiry Command as a Virtual LUN is that only the Virtual LUN is disclosed to the host computer.

Next, in step 805, storage subsystem makes a judgment whether the Virtual LUN corresponding to the WWN is actually obtained in the step 804. When it has been obtained, i.e. the Virtual LUN corresponding to the WWN does exist in the "LUN Access Management Table", the host computer is permitted to access to the Virtual LUN. When the required Virtual LUN doesn't exist in the Table, the host computer is refused access to the LUN.

If the access to the Virtual LUN by the host computer is permitted in step 805, then, in step 806, the storage subsystem sends the Inquiry Data which has the setting that the target LU is installed (i.e. accessible) as a response to the Inquiry Command. On the other hand, if the access to the Virtual LUN specified by the host computer is refused, then, in step 807, the storage subsystem sends the Inquiry Data, which has the setting that the target LU is not installed (i.e. not accessible), as a response to the Inquiry Command. The host computer which received the Inquiry data analyzes the frame.

After the host computer has recognized that the access to the Virtual LUN in the storage subsystem was permitted as a result of the analysis, the host computer may issue Commands (I/O Requests) continuously to the Virtual LUN. Furthermore, as shown in step 808, the storage subsystem can continue to receive Commands without checking the accessibility of the LU so long as the LOGIN from the host computer is kept valid.

On the other hand, the host computer that recognized that the access to the LUN was refused, does not access the corresponding LU so long as the LOGIN from the host computer is kept valid. Hereinafter, the above-mentioned technique which controls the accessibility of the specified LU in a storage subsystem by the host computer is called "LUN Security" for convenience. Next, the details about each of the above-mentioned procedure are explained.

First, the creation of the "LUN Access Management Table" of the above procedure is explained. The LUN Security in specific embodiments according to the present invention is managed at each port of the storage subsystem so that the host computer accesses the LU in the storage subsystem through the port of this storage subsystem. In such specific embodiments, a technique in which a table 901, shown in FIG. 9, is established. Table 901 defines the correspondence of the WWN, which is the information to identify a host computer, uniquely to the LUN (Logical Unit Number) in the storage subsystem permitted to be accessed by the host computer.

However, in an operational environment in which hubs or switches for the fiber channel exist between the host computers and the storage subsystem, table 901 can be supplemented by further techniques according to the present invention, as explained below.

Table 901 directly allocates the LU in the storage subsystem according to the LUN (Logical Unit Number), which is an identifier of the LU to the WWN of host computer. In the representative example illustrated in FIG. 9, a host computer WWN902 is permitted to access only LU0 to LU2, a host computer WWN903 is permitted to access only LUs3, 4, and 7 and a host computer WWN904 is permitted to access only LUs 5, and 6. For example, the LU0 to LU2 may not be accessed by the host computers other than that of the WWN902, and therefore, the LUN Security is realized. However, when the access to the LU0 was rejected, the majority of modem host computers do not inquire any further into the accessibility of the LUs belonging to the same series as LU0. For example, according to the SCSI1 or SCSI2 standard, one series comprises of 8 LUs, and therefore LU0 to LU7 comprise one series.

Then, so long as measures like that in Table 901 are used, the host computer 903 or 904 happens not to inquire the LUNs even though these LUNs are listed in the table 901 as permitted to be accessed by these host computers, because they could not access the LU0. This situation is quite serious for storage subsystems such as the disk array subsystem that can provide abundant storage resources, because the coefficient of utilization in such disk array subsystems will be decreased.

If the access to the LU0 by the host computer 903 and 904 is permitted in order to avoid this problem, then the security of the LU0 is not assured. Even if the security problem is not considered further, if the host computer 903 and 904 have different operating systems, and therefore have different types of storage formats, then, the LU0 cannot be easily shared by both host computers.

Figures 10, 11:
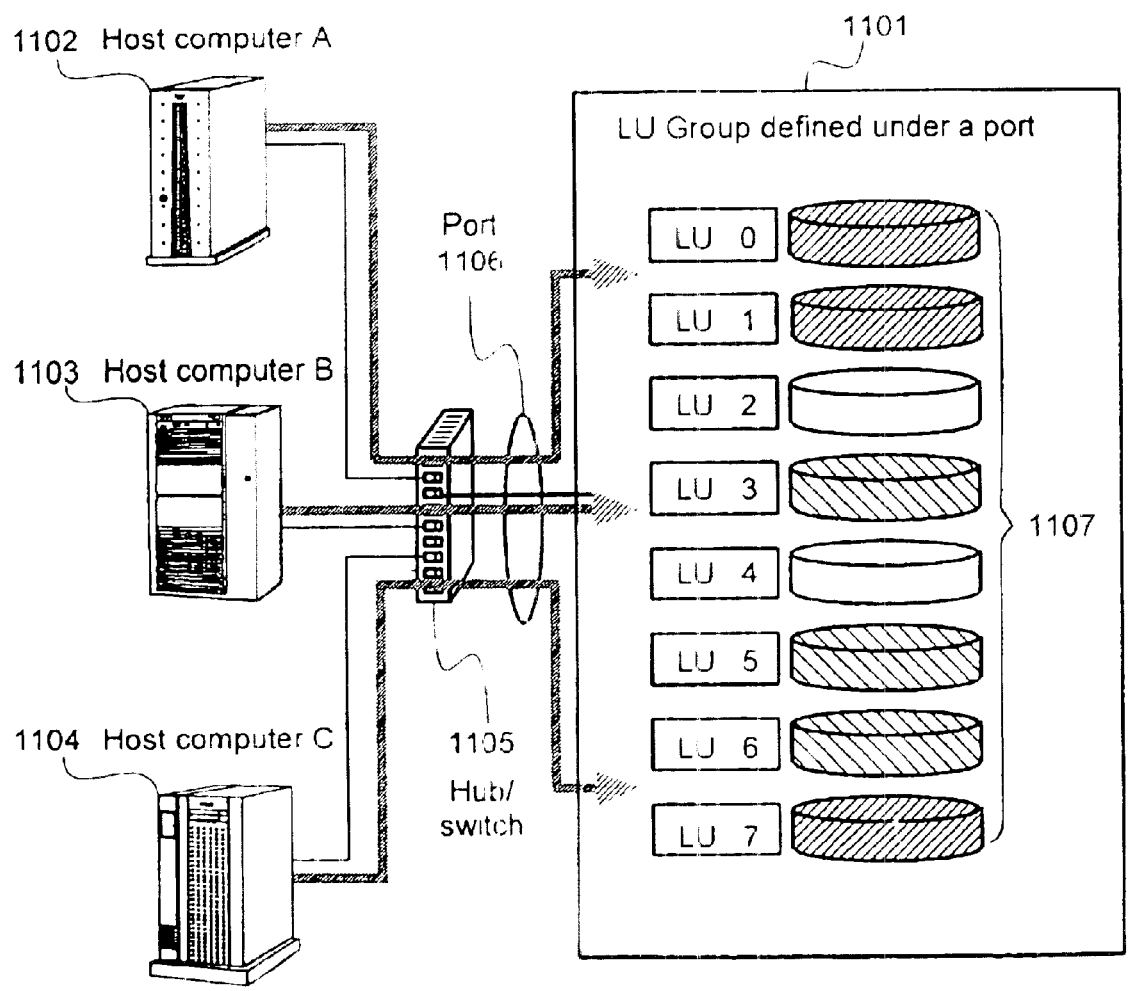
FIG. 10 illustrates a format of an incomplete "LUN Access Management Table" which can arise when the present invention is not applied.
FIG. 11 illustrates the condition shown in FIG. 10.

On the other hand, in the FIG. 10, the host computers having WWNs 1002–1004, which inquire all LUNs about their existence even if the LU0 does not exist under the port to which the host computers are connected, are supposed to exist. In the representative example embodiment illustrated by FIG. 10, a host computer WWN1002 is permitted to access only LUs0, 1, and 7, a host computer WWN1003 is permitted to access only LUs3, 5, and 6 and a host computer WWN1004 is permitted to access only LUs2 and 4.

FIG. 11 shows the representative embodiment of FIG. 10 more visually. The host computers 1102–1104 correspond to the host computers WWNs1002 to 1004 in FIG. 10. The host computers 1102–1104 are connected to the same port 1106 of the storage subsystem through hubs and switches 1105 for the fiber channel. In such an operational environment, if the LUNs are defined unsystematically or the LAN different from the former ones are assigned to the host computers 1102–1104, LUs under the port appear as if they are scattered and broken in fragments like LU group 1107. This condition can arise because storage subsystems like storage subsystem 1101 disclose the LUNs in the storage subsystem as they are physically arranged, having no flexible way to disclose the LUNs. Disk management problems can be solved using the techniques according to the present invention as described herein below.

Recently, some host computers can accept more than 8 LUs defined under a port within the storage subsystem. The problems inevitable when the LUN Security is applied to a system containing both types of the host computers such as new type of host computers accepting more than 8 LUs and conventional types of host computers only accepting maximum of 8 LUs, LU0 to LU7 are described below.

Figures 12, 13:
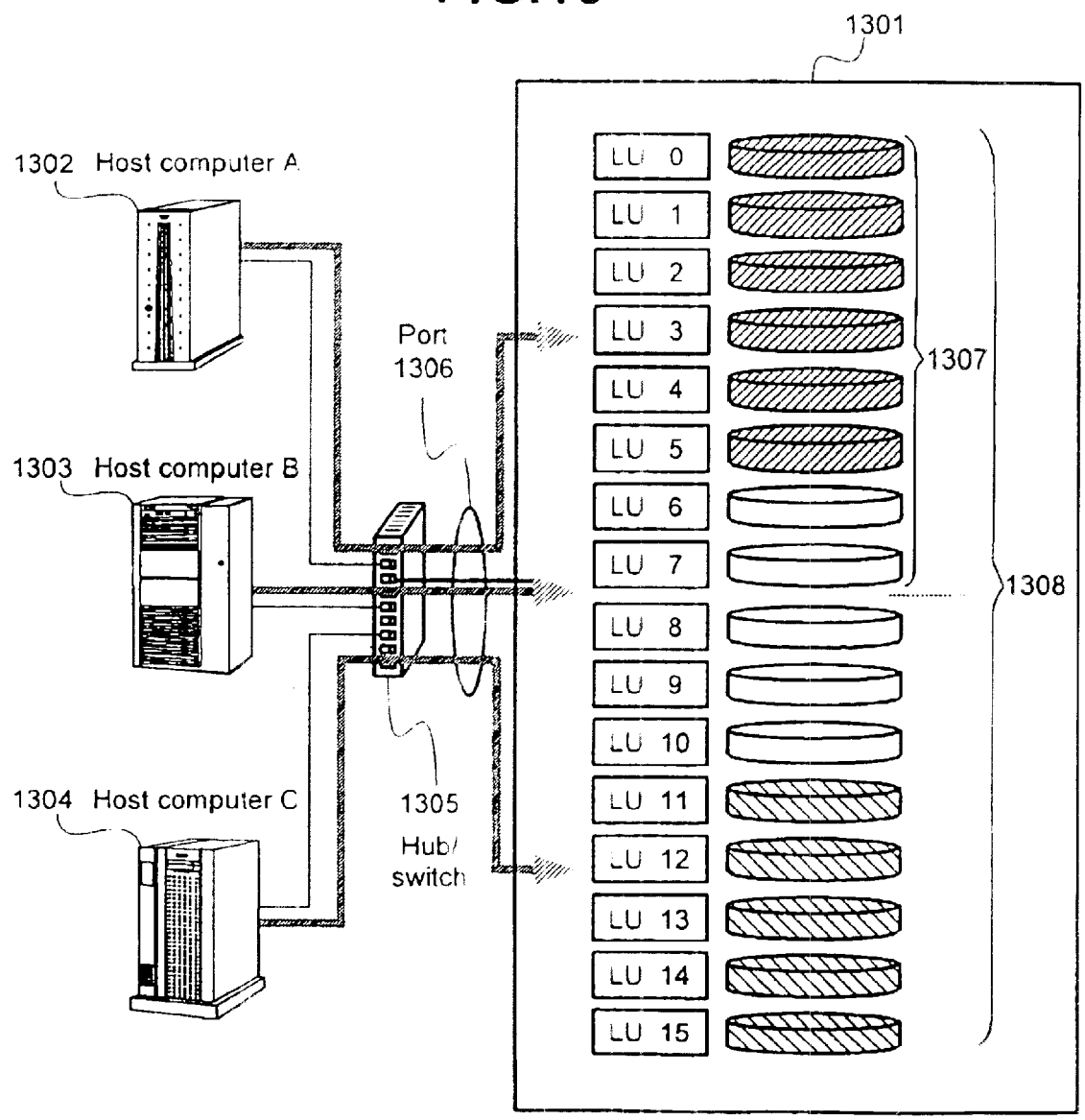
FIG. 12 illustrates another example in which format of an incomplete "LUN Access Management Table" which can arise when the present invention is not 15 applied.
FIG. 13 illustrates the condition shown in FIG. 12.

The description will be applied to the representative example embodiment illustrated by FIG. 12, in which the host computers corresponding to WWN1202 and WWN1204 have a mechanism with which to inquire each LU about its existence even if no LU0 exists under the associated port of the connected storage subsystem. Further, such host computers can recognize up to 16 LUs under a single port of the connected storage subsystem.

Suppose that in a particular embodiment, the host computer having WWN1203 can query each LU about its existence even if LU0 does not exist under the port of the connected storage subsystem, however the LUs supported by the host computer is up to 8 ranging from LU0 to LU7. As shown in the Table 1201, the host computer having WWN1202 is permitted to access LUs in the range of LU0 to LU5, the host computer having WWN1203 is permitted to access LUs in the range of LU6 to LU10, and the host computer having WWN1204 is permitted to access LUs in the range of LU11 to LU15. FIG. 13 illustrates a representative embodiment in which this condition exists.

FIG. 13 illustrates representative host computers 1302–1304 that correspond to the host computers having WWN1202–1204 illustrated in FIG. 12. The host computers 1302–1304 are connected to the same port, port 1306 of the storage subsystem, through the hubs and switches for the fiber channel. In this environment, when LUs in the storage subsystem, such as LU group 1308, are assigned to each of host computers 1302–1304, the host computer A 1302 can recognize only the LUs0 to LU5 in the LU group 1308 as permissible to access, and the host computer C 1304 can recognize only the LU11 to LU15 in the LU group 1308 as permissible to access, and therefore, the purpose of the LUN Security is satisfied so far. However because the host computer B 1303 supports only up to 8 LUs ranging from LU0 to LU7 under a port, it can inquire only within the range of LU group 1307. Therefore, in this case, the host computer B 1303 can access actually only LU6 and LU7, even if LU6 to LU10 are set to be accessible to the host computer in table 1201. This problem is also caused by directly disclosing the LUs in the storage subsystem as they are arranged.

In a representative embodiment according to the present invention, a "LUN Access Management Table" 1401 is defined as illustrated in FIG. 14. The Table 1401 defines, for each port in the storage subsystem, a combination of an LUN in the storage subsystem, a Virtual LUN created by renumbering the LUN according on the user's convenience, for example, and a WWN of the host computer likely to access the Virtual LUN. Thus, table 1401 is in contrast to the Table 901 in FIG. 9, the Table 1001 in FIG. 10, or the Table 1201 in FIG. 12 in which relationships are depicted between physical LUNs and the WWNs.

In table 1401, the user can provide a Virtual LUN with correspondence to any number of LUNs using any of a plurality of assigning techniques, such as numbering or the like. As a result, the storage subsystem which defines this "LUN Access Management Table" 1401 can disclose any LUNs depending on the user's convenience, for example, to the host computers. In such specific embodiments, because the LUN that is permitted to be accessed by a host computer is not the real LUN 1417 but the Virtual LUN 1416, it is no longer necessary to worry about the fragmentation of the LUN values and existence of LU0. Thus, specific embodiments can provide users with optimum and flexible LUN combinations for meeting their needs.

In FIG. 14, the host computer having WWN1402 is permitted to access the real LUNs0–3 through the Virtual LUNs0–3. In the same way, the host computers having WWNs1403–1414, are permitted to access the real LUNs listed in 1417 through the Virtual LUNs listed in 1416, respectively. Accordingly, each host computer can process LUs other than LU0 in a substantially similar way as that for LUN0.

A characteristic result caused by using this "LUN Access Management Table" 1401 is that the host computers having WWNs1402–1405 are capable of accessing the different LUNs resulting in effective use of the storage resource. Further, exclusive access security can be provided between these host computers, even though each host computer looks as if it is accessing the LU0 under the connected port.

The details of the numbering of the Virtual LUN corresponding to the actual LUN are shown. The numbering schema that the most users are likely to use is to increment the value by 1 for each WWN starting from LU0 as shown in WWNs1402–1404, taking the correspondence to the traditional SCSI standard in consideration.

However, in some applications, it may be preferred to use only odd numbers or even numbers of the Virtual LUNs like those in WWN1407 or WWN1408. In those cases, the host computer having WWN1407 or WWN1408 is actually permitted to access LUs with the consecutive numbers, LUs30 to 34 or LUs35 to 38, respectively. Also, if a host computer can access any LUN without accessing LU0, like WWN1409, it is enough to permit access to only the Virtual LUN corresponding to the requested LUN. Also, the correspondence like WWN1410 and WWN1411 is convenient when two or more different host computers are to be grouped optionally. Additionally, in the cases of WWN1412 and WWN1413, both host computers share the same real LUNs and receive the same information, even though they look as if they are permitted to access the different LUNs. This can provide useful operations in specific embodiments.

Moreover, in the case of a storage subsystem comprising of a RAID made by arrayed disk groups, it is possible to assign one LU to each different RAID group and to increase the number of storage units (magnetic disk drives) which contribute to the I/O performance. The WWN1414 in FIG. 14 illustrates this technique.

Figures 15, 16:
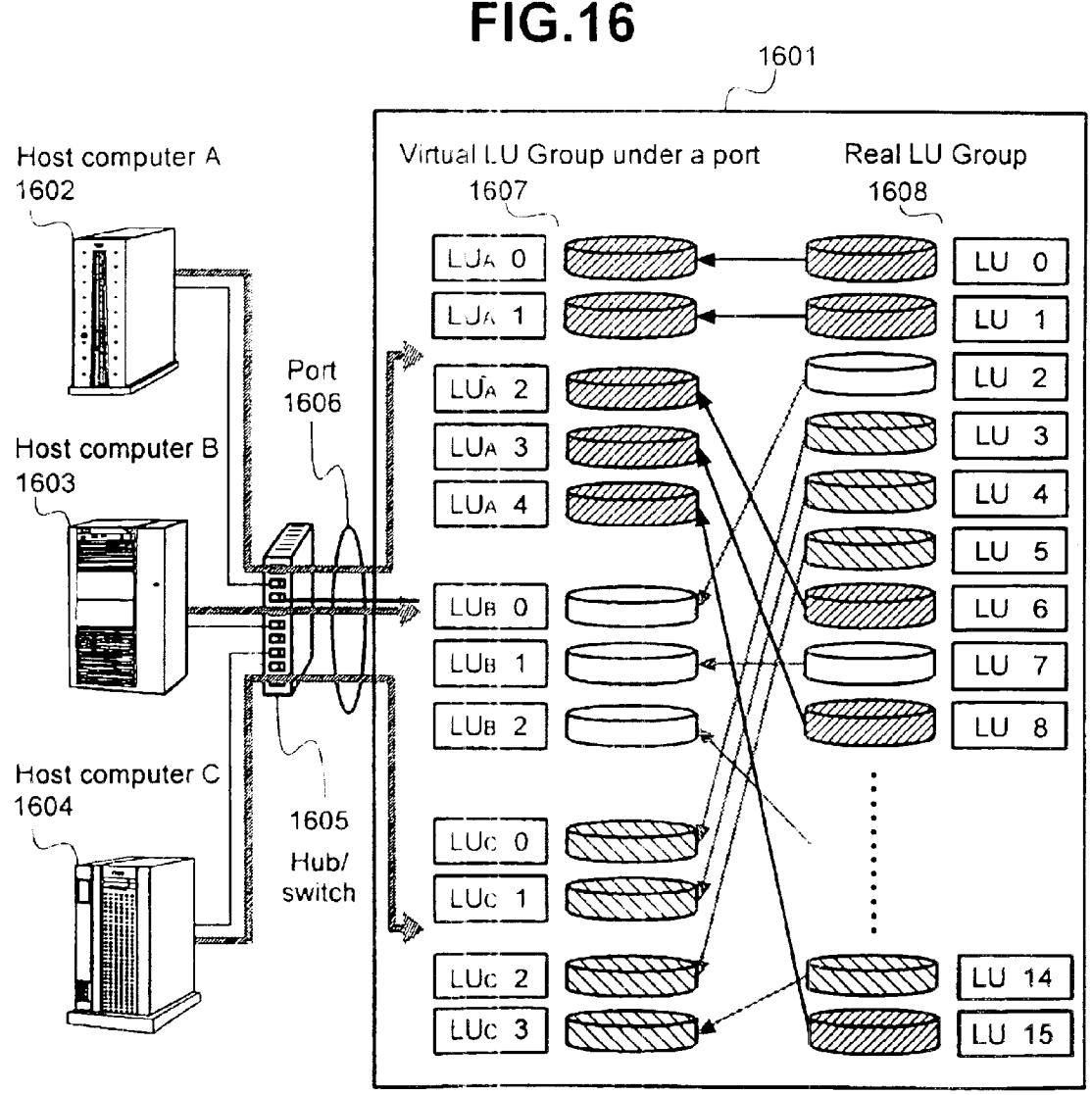
FIG. 15 illustrates a representative format of the "LUN Access Management Table" in a particular embodiment of the present invention.
FIG. 16 illustrates a representative technique for providing LUN Security in a particular embodiment of the present invention.

The effectiveness of assigning a Virtual LUN to a real LUN using the "LUN Access Management Table" has been explained herein above with reference to representative specific embodiments according to the present invention. FIG. 16 shows specific embodiments employing such techniques according to the invention. The corresponding management table is shown in FIG. 15.

The real LU group 1504 allocated to each host computer in the table 1501 has a substantially unordered arrangement as illustrated by 1608 in FIG. 16. However, by replacing these actual LUs with of the Virtual LU group 1503 in the table 1501, each host computer may have the LUs disclosed as illustrated by 1607, independent of the real arrangements 1608 in the storage subsystem 1601. Accordingly, the flexible operation of the storage subsystem resource becomes possible.

Figure 17:
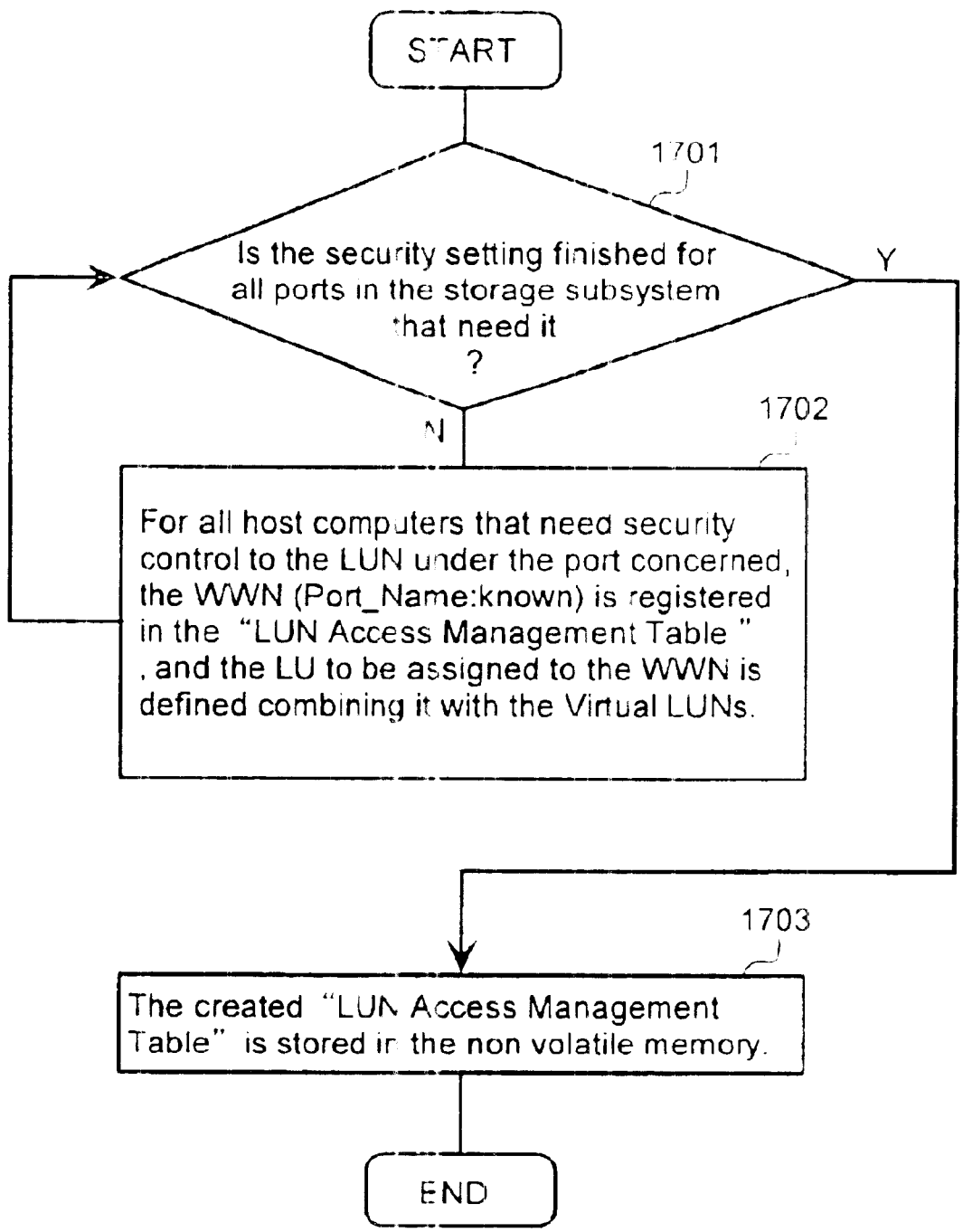
FIG. 17 illustrates a representative sequence to create the "LUN Access Management Table" in a particular embodiment of the present invention.

The "LUN Access Management Table" 1401 and 1501 of the present invention is maintained in the non volatile memory in the storage subsystem after it is defined to the ports of the storage subsystem as shown in steps 1701 to 1703 in FIG. 17. Residing in the non volatile memory, the content of this table is not lost even if the electric power is removed from the storage subsystem.

Next, the processing when a storage subsystem receives a LOGIN procedure from a host computer is explained. In a specific embodiment, through a series of LOGIN processing steps, the S_ID, which uniquely identifies the host computer after the LOGIN procedure, is linked to the WWN, which uniquely identifies the host computer. When the host computer is initiated, the storage subsystem receives a PLOGI frame, as illustrated by step 1801 in FIG. 18.

The storage subsystem that has received the PLOGI frame fetches the S_ID of the host computer from the Frame Header in step 1802. Then, the storage subsystem fetches the WWN (N_Port_Name) of the host computer from the Data Field in step 1803. Next, the storage subsystem registers the received WWN and S_ID pair into the "WWN-S_ID Conversion Table" 1901 in step 1804 of FIG. 19. This table is maintained in the non volatile memory in step 1805. The "WWN-S_ID Conversion Table" 1901 is prepared for each port of the storage subsystem.

According to this technique, when a Command is transferred from a host computer having the WWN registered in the table thereafter, the storage subsystem extracts the S_ID from the received Frame Header, and then searches the "WWN-S_ID Conversion Table" 1901 for the WWN allocated to the host computer.

After the "WWN-S_ID Conversion Table" is stored in the non volatile memory, the storage subsystem transfers an ACC frame in step 1806 in order to notify host computer that the LOGIN has been accepted. After the host computer receives the ACC frame from the storage subsystem, it can issue an Inquiry Command to the storage subsystem.

Figure 20A:
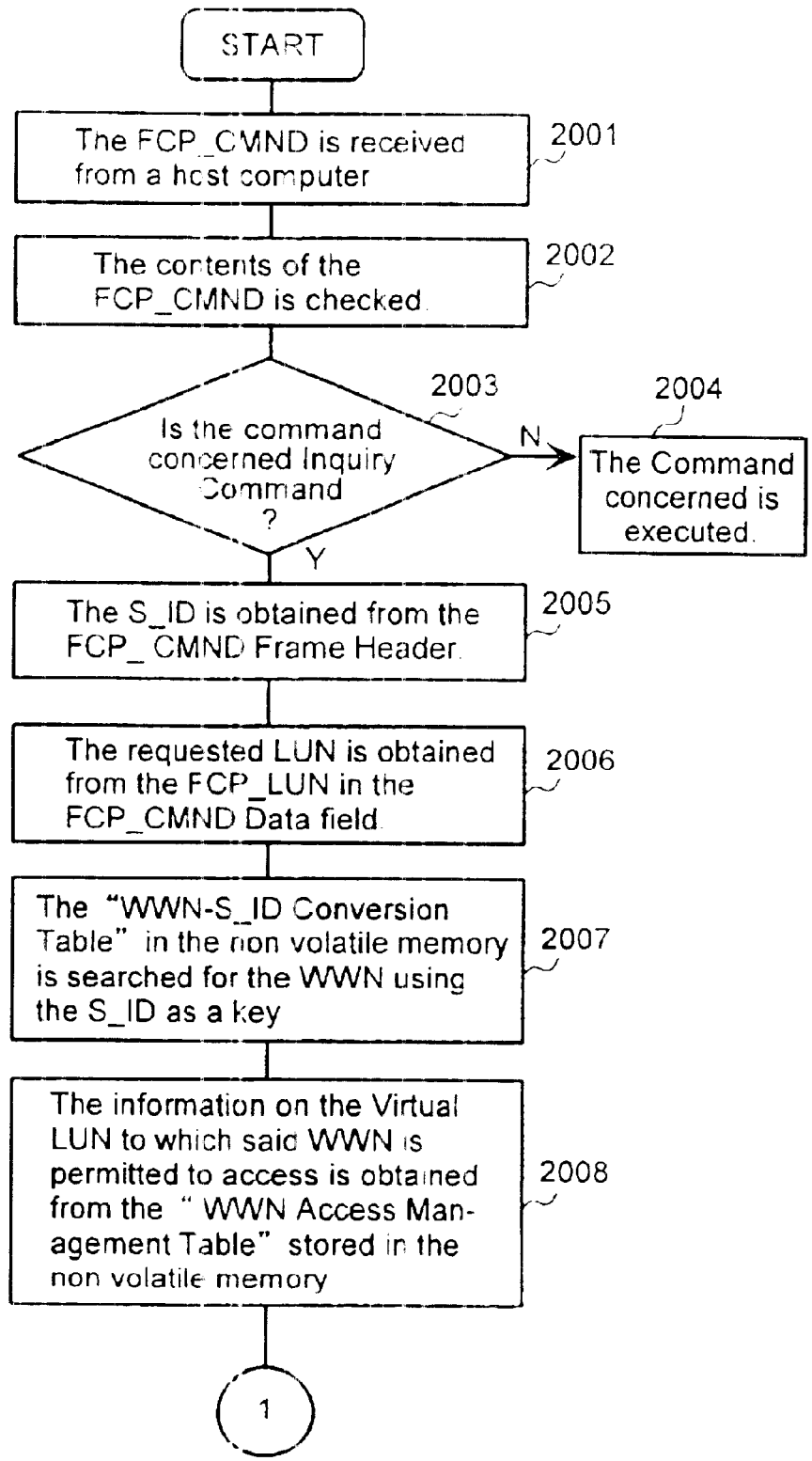
FIG. 20A illustrates a representative sequence to judge the accessibility of a LUN as a response to an Inquiry Command transferred from a host computer for providing LUN Security in a particular embodiment of the present invention.
Figure 20B:
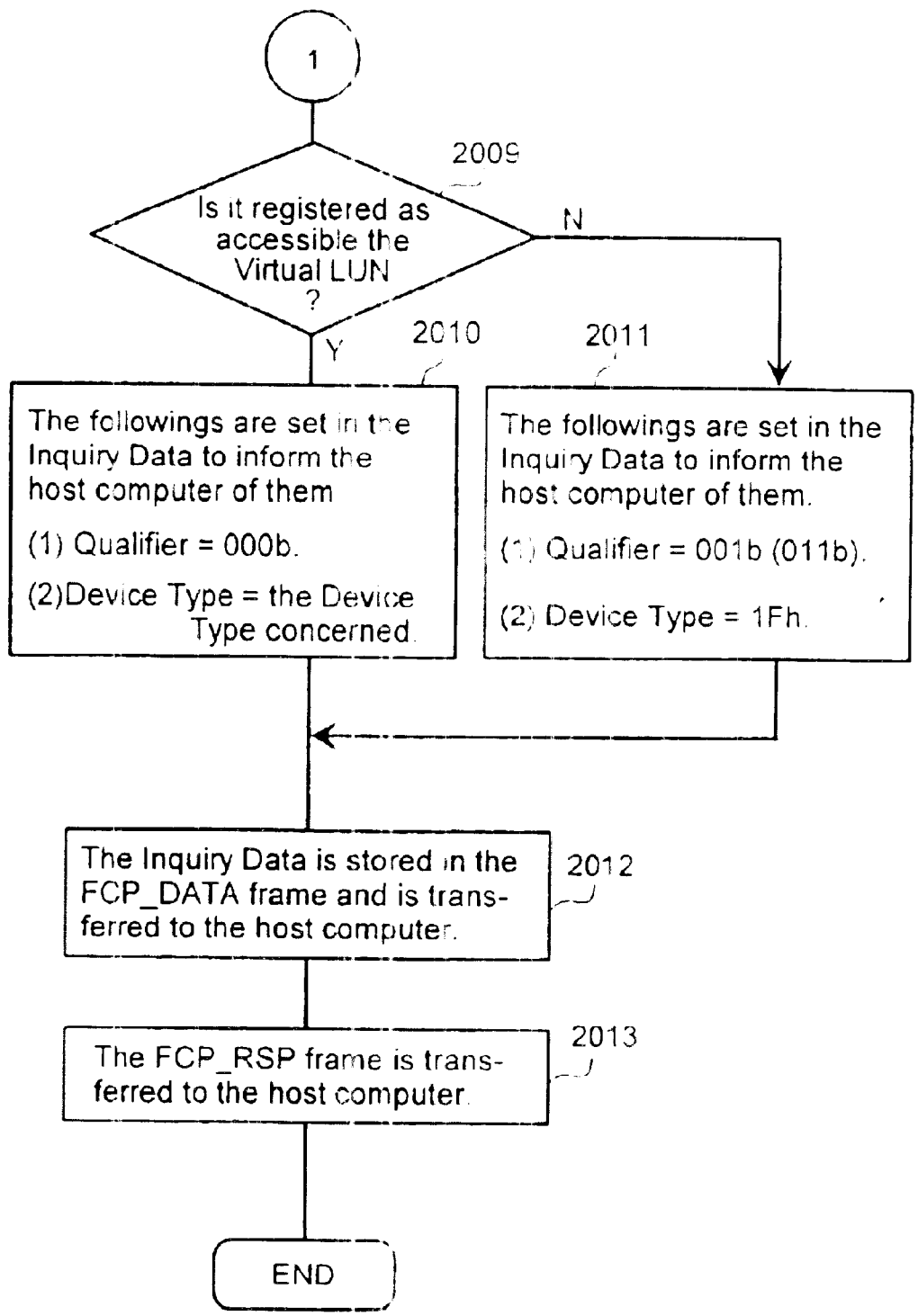
FIG. 20B illustrates a representative sequence to judge the accessibility of LUN as a response to an Inquiry Command transferred from a host computer for providing LUN Security in a particular embodiment of the present invention.
Figure 21:
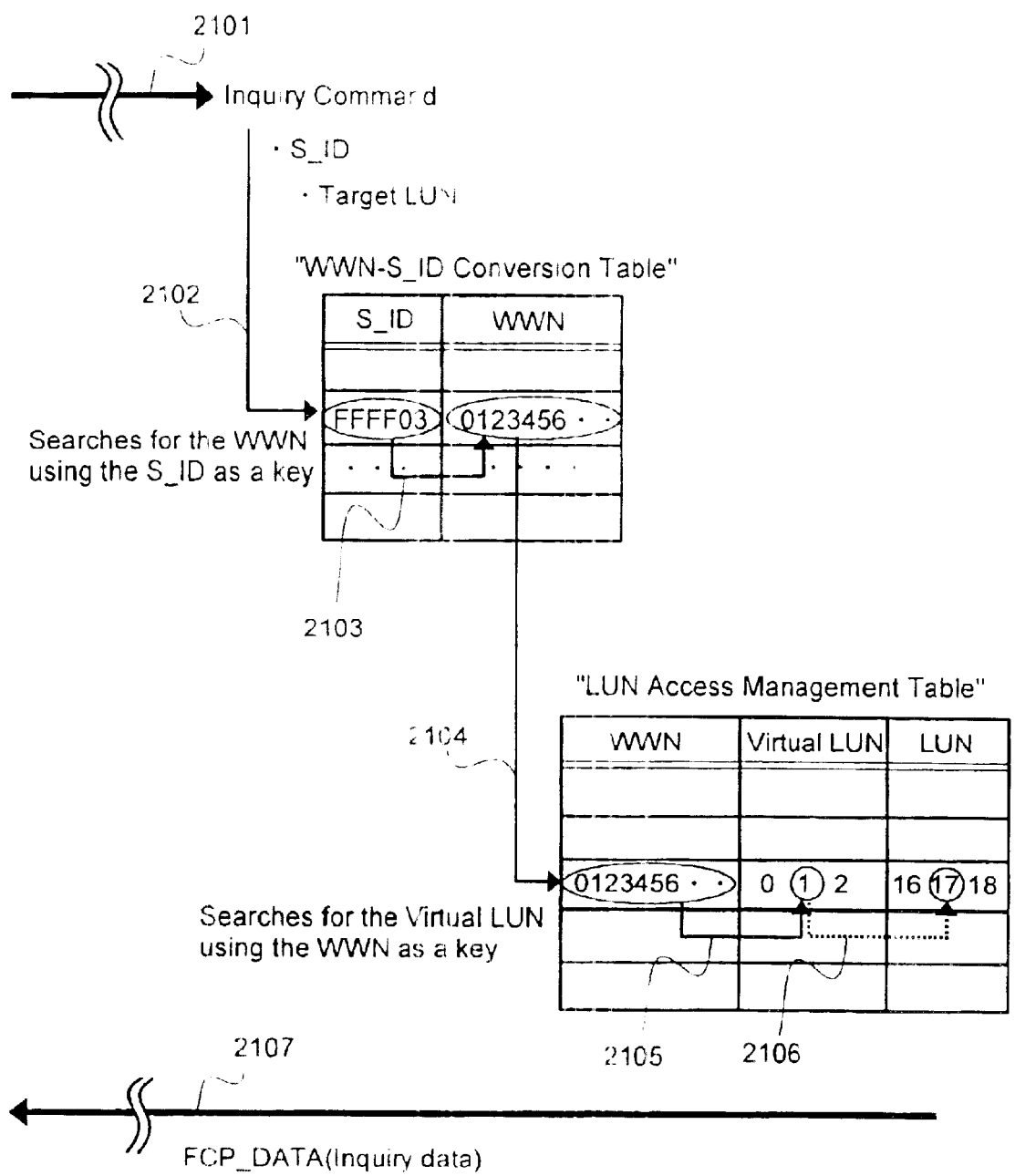
FIG. 21 illustrates relations among information in a plurality of tables for providing LUN Security in a particular embodiment of the present invention.

Next, a procedure used by the storage subsystem to receive the Inquiry Command from the host computer and the responses made by the storage subsystem in order to provide security are explained. FIG. 20A and FIG. 20B show the flow representative processing and FIG. 21 shows the referencing relation of each table and the parameter used in the flow of such processing. In step 2001 in FIG. 20A, the storage subsystem receives the FCP_CMND frame specified by the fiber channel from the host computer. Then, the storage subsystem analyzes the contents of the Data Frame of the FCP_CMND in step 2002.

Next, the storage subsystem checks whether the content of the FCP_CMND is an Inquiry Command in step 2003. In the case that it is not the Inquiry Command, the storage subsystem executes the appropriate processing corresponding to the command in step 2004. Otherwise, in the case of the Inquiry Command, the storage subsystem extracts the S_ID of the host computer from the header of the FCP_CMND Frame in step 2005. The targeted LUN is extracted from the FCP_LUN in Data Field of the FCP_CMND Frame in step 2006. Then, the storage subsystem searches the "WWN-S_ID Conversion Table" 1901 in FIG. 19 for the WWN corresponding to this S_ID using the S_ID as a key in step 2007. The operational flow described is illustrated by the referencing operations of 2101 and steps 2102 and 2103 in FIG. 21.

Next, the storage subsystem attempts to acquire the Virtual LUN information which it is permitted to access using this WWN in step 2008. Then, it judges whether the LUN obtained from the Inquiry Command from the host computer having the WWN, is registered as a Virtual LUN permitted to access in the "LUN Access Management Table", in step 2009. The operational flow described herein is illustrated by referencing operation of 2104 and 2105 in FIG. 21.

If the LUN obtained in step 2006 is registered as the Virtual LUN in the entry of the "LUN Access Management Table," then the host computer is permitted to access the Virtual LUN. Accordingly, the storage subsystem sets 000 (binary) in the Qualifier and Device Type Code corresponding to the storage subsystem in the Device Type in the Inquiry Data for the response to the host computer in step 2010.

Otherwise, if the LUN obtained in step 2006 is not registered as the Virtual LUN in the entries of the "LUN Access Management Table," then, the host computer's requested access to the Virtual LUN is rejected. Accordingly, the storage subsystem sets '001'or '011' (binary) in the Qualifier and Device Type Code 1F (hexadecimal) in the Device Type in the Inquiry Data for the response to the host computer in step 2010.

The storage subsystem sets above-mentioned Inquiry Data for response to the Inquiry Command in the FCP_DATA Frame in step 2012 and transfers it to the host computer. Next, the storage subsystem transfers the FCP_RSP Frame which notifies the host computer that the response to the Inquiry Command has completed in step 2013.

Following the steps 2010 and 2012 in FIG. 20A, the host computer which received the FCP_DATA containing the Inquiry Data from the storage subsystem, understands that the LUN is accessible, and may continue to access the LUN without inquiring about the accessibility of the Virtual LUN any more. The LUN accessed by the host computer is actually the LUN of step 2106 in FIG. 21. The reference operation in step 2106 is the internal reference work in the storage subsystem and the host computer is not required to worry about it. On the other hand, the host computer which received the FCP_DATA containing Inquiry Data from the storage subsystem following steps 2011 and 2012 in FIG. 20A, understands that the LUN is not accessible, and thereafter will not access the Virtual LUN also, without inquiring about the accessibility of it any more.

According to a particular embodiment of the present invention, the host computer queries the LUN to determine the LUN's accessibility when the host issues an Inquiry Command. In other words, while the LOGIN is valid, any more repeated inquiry is not required. Thus, specific embodiments employing such techniques can achieve strong LUN Security without sacrificing data transfer efficiency between the host computers and a storage subsystem.

As described herein above, specific embodiments according to the present invention can realize highly reliable LUN Security, and can provide the host computers with efficient utilization of the storage resources in the storage subsystem and fast judgment logic to check the accessibility of the LUN. Such specific embodiments can insure that, for each port in the storage subsystem: at least one LU exists in the storage subsystem, a Virtual LUN created by arbitrarily renumbering the actual LUN, and the WWN of the host computer which is likely to access the Virtual LUN. Further, no modification on the host computer side is required for the current operational procedures.

In the representative example embodiments described herein above, the fiber channel has been employed to provide a protocol between the host computer and the storage subsystem, however, fiber channel is not required to realize specific embodiments according to the present invention. Rather, any applicable protocol environment providing substantially similar function can be used in various specific embodiments. Also, as for the storage subsystem, disk array subsystem is mainly described in this example embodiment, however, the present invention is also applicable to storage subsystem such as the optical disk library and the magnetic tape library by replacing the storage media with removable ones.

Next, yet further representative embodiments according to the present invention will be described below. Specific embodiments according to the present invention can provide techniques for realizing the LUN Security to the specific group comprising one or more host computers. The specific embodiments described herein below will be explained based upon the fiber channel as an interface protocol between the host computers and a storage subsystem, however, such fiber channel interface is not required in these embodiments.

In the environments shown in FIG. 1, FIG. 11, FIG. 13, and FIG. 16, having hubs, switches or other devices for the fiber channel, the host computers made by various vendors are expected to access the same port of the storage subsystem. In the environment in which the host computers made by such various vendors coexist, problems can occur concerning sharing of the storage resources in a storage subsystem. If the vendors are different, OS's installed on the host computers are often different. This condition often occurs if the host computers belong to work station (WS) or Mainframe type and the like. When the host computers are PC type, even if the vendors are different, because the OS's are in many cases Windows families, this condition occurs less frequently.

When the OS's are different, the recording formats, the access logic, the executable scripts, and the applications for the storage resources are often different, as well. Therefore, it is difficult to share a volume among such host computers made by different vendors.

Therefore, it is desirable to realize the LUN Security function so that the accessibility to the storage resource is defined for each group of host computers made by a particular vendor. Moreover, in specific embodiments which provide such an LUN Security, the storage subsystem can provide the host computer group permitted to access with exclusive services or specific functions in the storage resource.

Figures 22, 23:
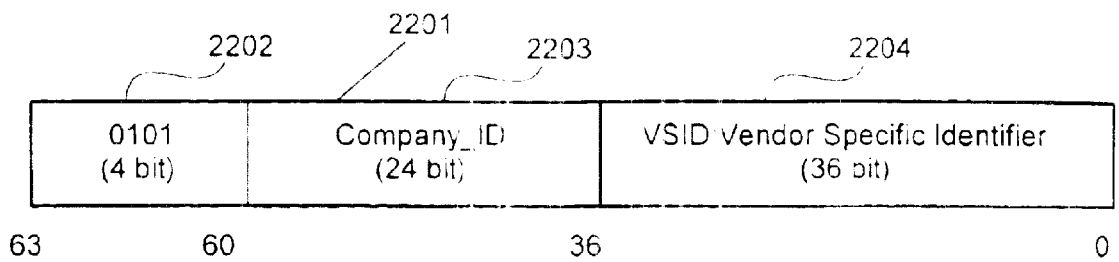
FIG. 22 illustrates an example of the WWN format in a particular embodiment of the present invention.
FIG. 23 illustrates a representative format of a "LUN Access Management Table" for controlling access based upon a vendor identity in a particular embodiment of the present invention.

Therefore, in a specific embodiment, a representative example includes definitions to permit access to the LUs in the storage subsystem depending on the vendor of the host computers, for example. In some representative embodiments, the "LUN Access Management Table" can be defined to include vendor information, or other grouping information. In specific embodiments, the vendor of a host computer can be recognized based upon the WWN, for example. The 2201 in FIG. 22 shows one of the formats for a WWN. As shown in this figure, representative WWN2201 is comprised of an Identifier Field 2202 defined by a bit area 60–63 (4-bit area), for example, a Company_ID 2203 defined by a bit area of 36–59 (24-bit area), for example, and a VSID (Vendor Specific Identifier) 2204 defined by a bit area of 0–35 (36-bit area), for example.

In a specific embodiment, Company_ID 2203 can be a global identity information allocated by IEEE to uniquely identify each computer and communication equipment vendor all over the world. The VSID 2204 is the unique identity information uniquely defined by the vendor and approved by IEEE to use the Company_ID 2203. As any one may know this Company_ID of each vendor by checking the publications of IEEE, the storage subsystem can know the vendor of the host computer attempting a LOGIN to the storage subsystem, if the Company_ID is known.

Although several kinds of formats are specified for the WWN standard, the Company_ID 2203 and VSID (Vendor Specific Identifier) 2204 are commonly included.

FIG. 23 illustrates a representative "LUN Access Management Table" 2301 in a particular embodiment according to the present invention. The "LUN Access Management Table" 2301 is defined for each port of the storage subsystem and comprises a LUN 2304 in the storage subsystem, a Virtual LUN 2303 created from the LUN by renumbering it by the user in the arbitrary schema, and a Company_ID 2302 of the host computer which is likely to access the Virtual LUN. Using this table 2301, users may link the Virtual LUN with any number of LUNs using any numbering schema.

Figure 18:
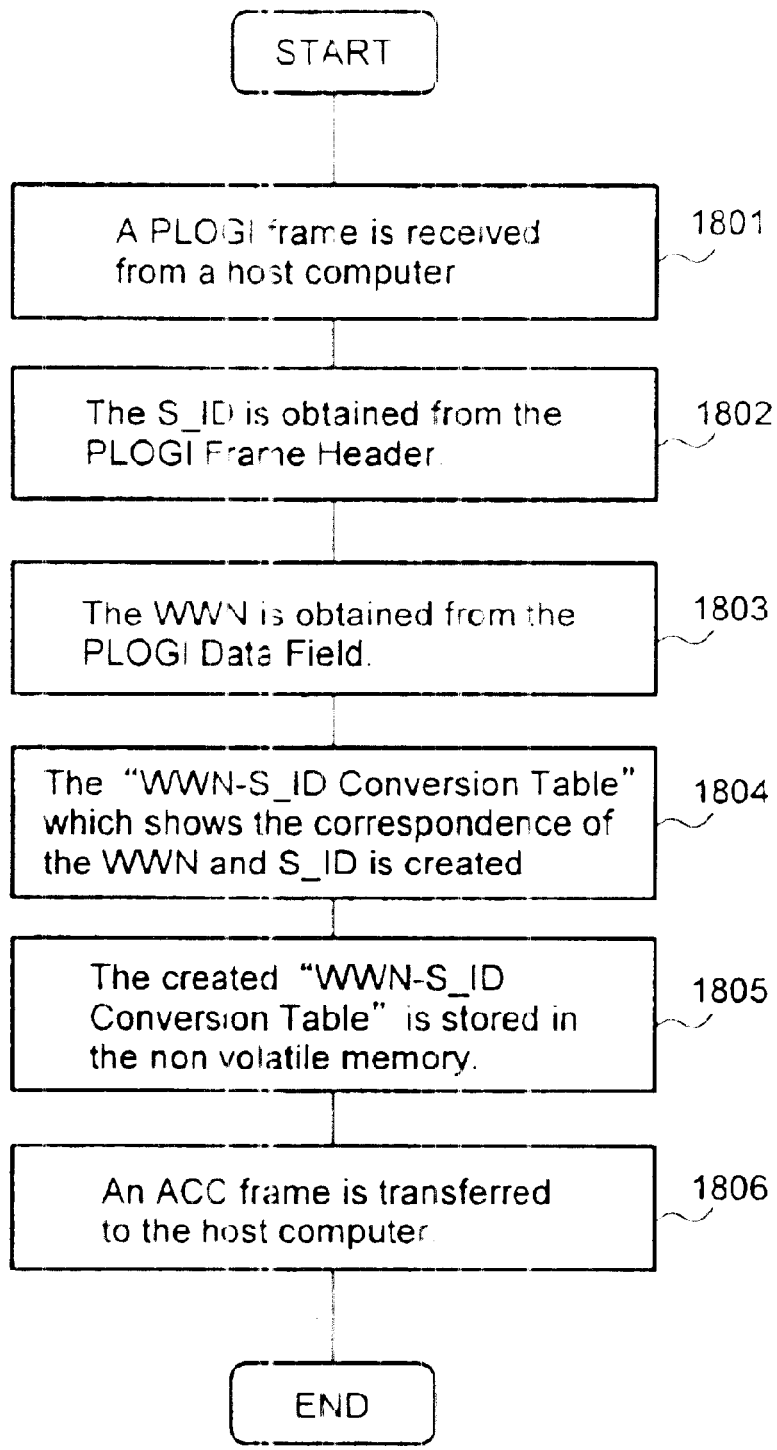
FIG. 18 illustrates a representative sequence to create a "WWN-S_ID Conversion Table" in a particular embodiment of the present invention.

Accordingly, in the storage subsystem which defined this "LUN Access Management Table" 2301, the LUN can be disclosed to the host computer made by each vendor in accordance with the users convenience. In this case, since the LUN access by the host computer of each vendor is not based upon the real LUN 2304 but the Virtual LUN 2303, it is not necessary to worry about the fragmentation of the LUN values and existence of LU0. Thus, users may be provided with optimum and flexible LUN combination meeting their demands. Additionally, the "WWN-S_ID Conversion Table" can be built in the same way as shown in FIG. 18, using the similar formats shown in FIG. 19.

Figure 24:
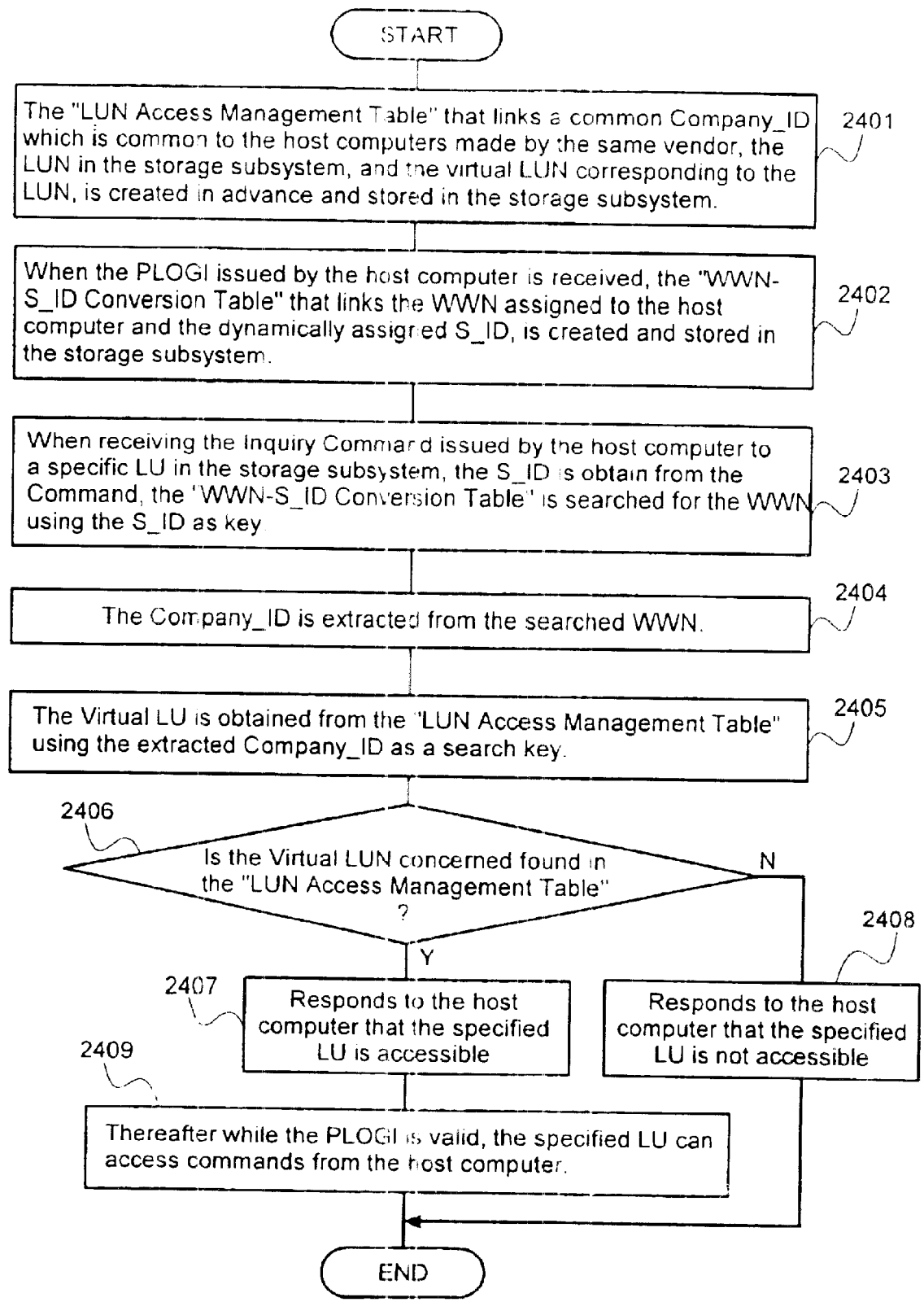
FIG. 24 illustrates an outline of a representative processing sequence for providing LUN Security based upon a vendor identity in a particular embodiment of the present invention.
Figure 25:
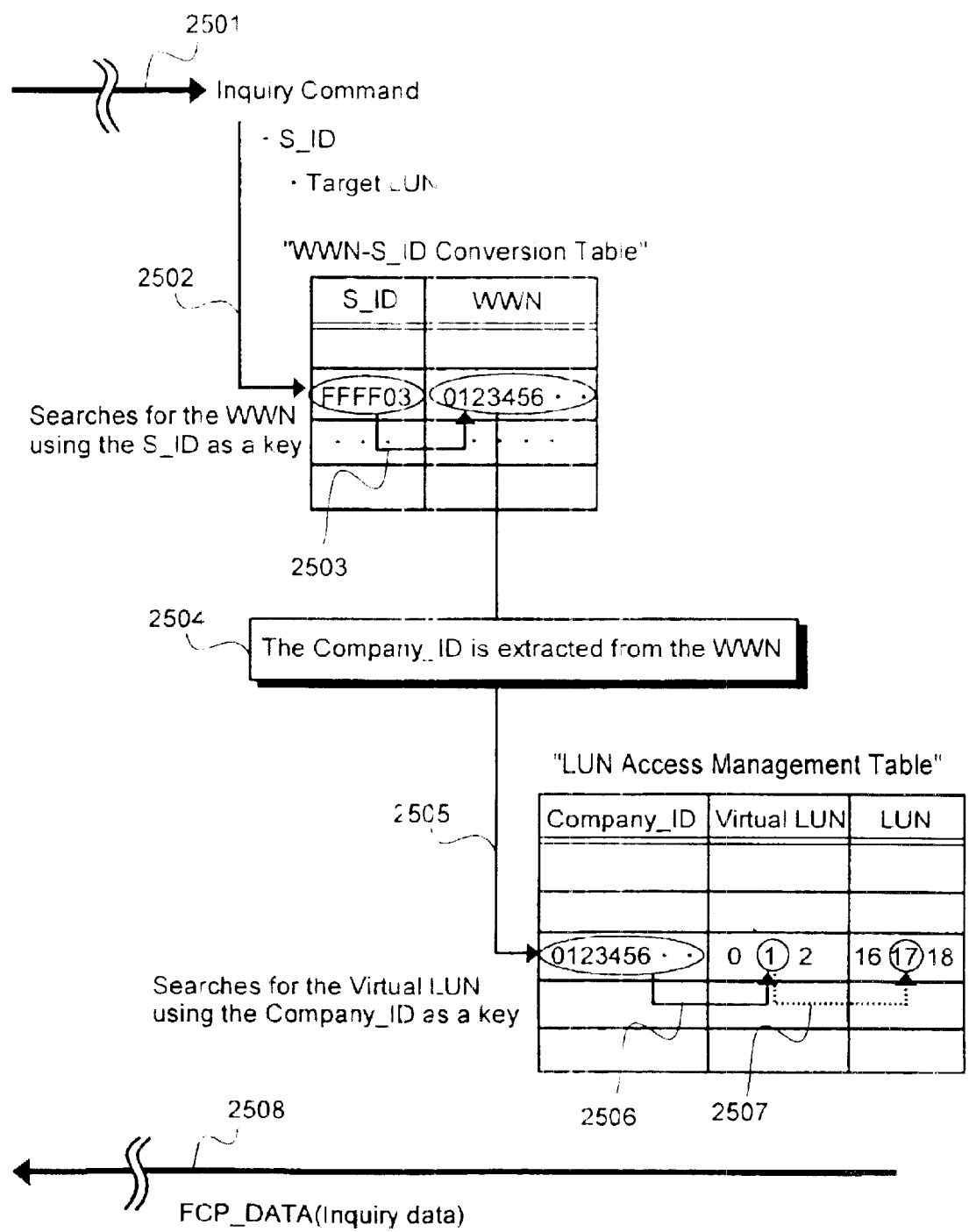
FIG. 25 illustrates relations among information in a plurality of tables for providing LUN Security based upon vendor identity in a particular embodiment of the present invention.

FIG. 24 shows representative processing flows of a particular embodiment according to the present invention, and FIG. 25 shows referencing relations of each table and the parameter used in the flow of this processing. At first, the user creates the "LUN Access Management Table" using the input unit 125 of the maintenance terminal unit 123 in step 2401. The LUN Access Management Table describes relationships between the LUNs existing in the storage subsystem, the Company_ID, which identifies the vendor of host computers likely to access the LUN, and the Virtual LUN, which determines how the LUNs appear to the host computers likely to access the LUN.

In a specific embodiment, this table is maintained in the non volatile memory 119 in the storage subsystem, for example. In this table, the Virtual LUN, rather than the actual LUN, is disclosed to the host computer. The Company_ID, which identifies each vendor, is already known. One reason access is determined based upon the Company_ID, not the WWN, in the "LUN Access Management Table" of this embodiment is that the accessibility of the LU should be decided not on a host computer basis but rather based upon the vendor of each host computer.

In step 2402, when a host computer issues a LOGIN to the storage subsystem, depending on the fiber channel protocol, the storage subsystem fetches the N_Port_Name, called WWN hereinafter, and the S_ID from the PLOGI frame and creates a "WWN-S_ID Conversion Table" which contains the combination of them. This table can be stored in the non volatile memory 119. The storage subsystem does this for all the PLOGI frames received.

Next, in step 2403, the storage subsystem receives the frame containing the Inquiry Command transferred by the host computer in order to determine the status of the Logical Units in the storage subsystem. The storage subsystem which receives this frame extracts the S_ID from the Frame Header and the LUN, which is a target of this command, from the Data Field. Then, the storage subsystem searches the "WWN-S_ID Conversion Table" for the WWN corresponding to this S_ID by using the S_ID as a search key.

Next, in step 2404, the storage subsystem extracts the Company_ID, comprising 24 bits in this specific embodiment, from the obtained WWN based on the format 2201 in FIG. 22. The operation to extract this Company_ID is specific to this particular embodiment, and it is thus not needed in other embodiments. Step 2403, 2404 correspond to 2501–2504 in FIG. 25.

Next, the storage subsystem searches the "LUN Access Management Table" using the obtained Company_ID as a search key and obtains a Virtual LUN corresponding to the LUN that is a target of the Inquiry Command. The reason for obtaining the LUN that is a target of the Inquiry Command as a Virtual LUN is that the Virtual LUN is disclosed to the host computer as the LUN in the storage subsystem.

Next, in step 2406, a judgment is made whether the Virtual LUN corresponding to the WWN was obtained in step 2405 or not. If it was obtained, or the Virtual LUN corresponding to the WWN was found in the "LUN Access Management Table", the Virtual LUN is permitted to be accessed by the host computer. If it was not obtained, the host computer's access attempt of the Virtual LUN is rejected.

If the Virtual LUN is found to be accessible by host computers made by the vendor as the result of step 2406, the storage subsystem transfers the Inquiry Data in step 2407 with the status set to indicate that the inquired LU is installed and the access is permitted as a response to the Inquiry Command issued by the host computer. These steps 2405, 2406, and 2407 correspond to 2505, 2506, and 2508 in FIG. 25.

On the other hand, if the Virtual LUN is determined to be inaccessible by host computers made by the vendor as the result of the step 2406, the storage subsystem transfers the Inquiry Data, in step 2408, with the status set to indicate that the inquired LU is not installed and the access is rejected as a response to the Inquiry Command issued by the host computer. The host computer which received the Inquiry Data analyzes the frame.

If the host computer made by the Vendor, found that the access to the Virtual LUN was permitted after the analysis of the frame, the host computer can issue commands (I/O Request) to the Virtual LUN continuously. In this case, as shown in the step 2409, the storage subsystem can continue to receive commands from the host computer made by the vendor, without checking the accessibility of the Virtual LUN so long as the LOGIN from the host computer made by the vendor is valid. The LUN permitted to be accessed by the host computer made by the vendor is actually the LUN in the storage subsystem uniquely corresponding to the Virtual LUN which is pointed in the reference operation in step 2507 in FIG. 25. The reference operation in this step 2507 is the internal reference work in the storage subsystem and the host computer does not need to worry about it. Otherwise, if the host computer made by the vendor recognized the LU access was rejected, it does not access to the LUN any more, so long as the LOGIN is valid.

In this embodiment, it is clear that the WWN of each host computer requesting access to the storage subsystem is not the object of the security. However, the vendor, that is, the group to which the host computer belongs is identified by obtaining the Company_ID comprising the WWN and treating the vendor as the object of the security.

This embodiment is explained in more detail with reference to FIG. 26 and FIG. 27. The "LUN Access Management Table" 2601 permits the host computer group 2605, having Company_ID 0000E1, to access the actual LUNs 0, 1, 6, 8, and 15 through the Virtual LUNs 0, 1, 2, 3, and 4. In the same way, Table 2601 permits the host computer group 2606, having Company_ID 0000E2, to access the real LUNs 2, 7, and 10 through the Virtual LUNs 0, 1, and 2. Further, Table 2601 permits the host computer group 2607, having Company_ID 0000F0, to access the real LUNs 3, 4, 5, and 14 through the Virtual LUNs 0, 1, 3, and 4.

Figures 26, 27:
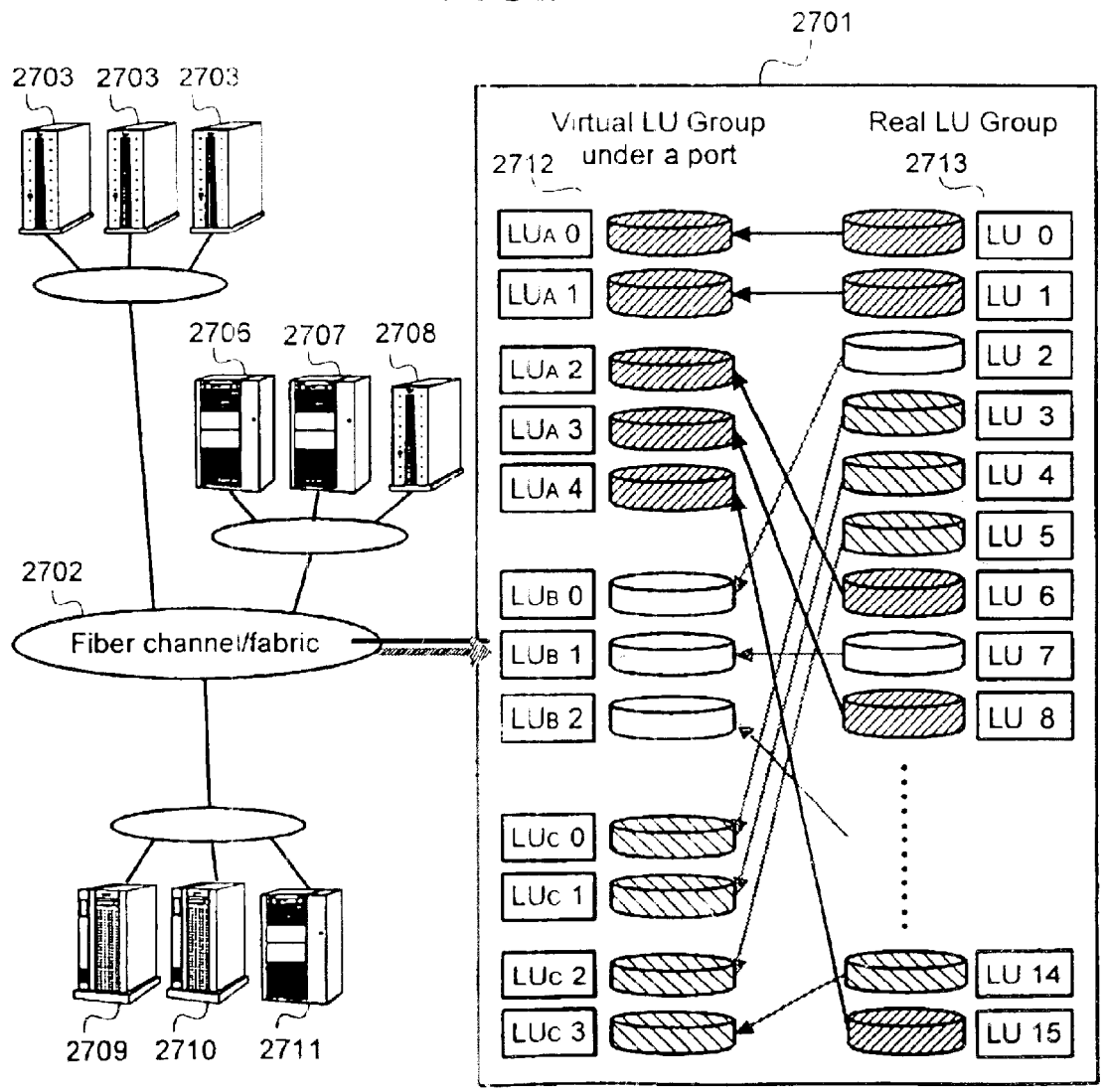
FIG. 26 illustrates a representative format of a "LUN Access Management Table" for controlling access based upon a vendor identity in a particular embodiment of the present invention.
FIG. 27 illustrates a representative technique for providing LUN Security according to vendor identity in a particular embodiment of the present invention.

FIG. 27 illustrates this. Various host computers 2703–2711 are connected to the single port of the storage subsystem 2701 via the fabric 2702 of fiber channel. Each of host computers 2703–2711 has a WWN, unique in the world. However, the host computers made by the same vendor have common Company_ID. The host computers 2703, 2704, 2705, and 2708 are made by the same vendor A and assumed to have Company_ID 0000E1. These host computers are permitted to access only the LUA0 to LUA4 according to the security setting in the "LUN Access Management Table" 2701, even though these host computers belong to different domains from each other.

In the same way, the host computers 2706, 2707, and 2711 are made by the same vendor B, and have, for example, a Company_ID of 0000E2. Then, these host computers are permitted to access only the LUB0 to LUB2 in the storage subsystem 2701 according to the security setting in the table 2601, even though these host computers belong to different domains from each other. Also, the host computers 2709 and 2710 are made by the same vendor C and have, for example, Company_ID of 0000F0. Then these host computers are permitted to access only the LUC0 to LUC3 in the storage subsystem 2701 according to the security setting in the table 2601, even though these host computers belong to different domains from each other. Among the different vendors of the host computers, a particular host computer blocked from accessing any LU permitted to the other vendors because of the exclusive mechanism based on the security setting in the Table 2601.

The LUN Security for each vendor of the host computers can be realized as described herein above. In specific embodiments, techniques for providing LUN Security can enable the storage subsystem to provide host computers of each vendor access to storage resources more efficiently. For example, because it is clear that the LUA0 to LUA4, LUB0 to LUB2, and LUC0 to LUC3 in 2712 are accessed by the different vendors respectively, the storage subsystem can provide host computers of each vendor permitted to access with appropriate storage format tailored to the OS operating in the host computer of each vendor. Also, the storage subsystem can provide OS of the host computers of each vendor with the specifically tailored executive scripts, application software, and service operations. Moreover, the storage subsystem 2701 may be individually customized by providing each vendor with the control information of its own.

As described herein above, specific embodiments can achieve highly reliable LUN Security, which can provide the host computers with efficient utilization of the storage resources in the storage subsystem. Specific embodiments can comprise fast judgment logic to check the accessibility of the specified LUN, with little or no modification needed in the processing in the host computers by insuring that, for each port in the storage subsystem, an actual LU exists in the storage subsystem, a Virtual LUN created by redefining to the LU using arbitrary numbering, and a Company_ID of the vendor of the host computer which is likely to access the Virtual LUN are provided.

In this example embodiment, the fiber channel was used as an example interface protocol between one or more host computers and a storage subsystem, however it is not required. In fact, embodiments according to the present invention can employ any protocol environment providing substantially similar functionality. Also, the present invention has been described with reference to example embodiments employing disk arrays as the storage subsystem, however, the present invention is applicable to other types of storage subsystems, such as optical disk library, and a magnetic tape library by replacing the disk storage with appropriate media. Moreover, grouping of the host computers was described on the basis of grouping by vendor of the host computers, however, the grouping can be done on the basis of any information sharable among two or more host computers.

The preceding has been a description of the preferred embodiment of the invention. It will be appreciated that deviations and modifications can be made without departing from the scope of the invention, which is defined by the appended claims.

CONCLUSION

Although the above has generally described the present invention according to specific systems, the present invention has a much broader range of applicability. In particular, while foregoing has described a specific embodiments having a fiber channel as an interface protocol between a storage subsystem and host computers, and the SCSI command set as a command interface operational under the interface protocol, as examples. However, the application of the present invention is not limited to the combination of the fiber channel and SCSI command set. Any protocol which provides similar function and structure of LOGIN, Inquiry, and the like may be used in various specific embodiments according to the present invention.

The specific embodiments described herein are intended to be merely illustrative and not limiting of the many embodiments, variations, modifications, and alternatives achievable by one of ordinary skill in the art. Further, the diagrams used herein are merely illustrations and should not limit the scope of the claims herein. One of ordinary skill in the art would recognize other variations, modifications, and alternatives. Thus, it is intended that the foregoing description be given the broadest possible construction and be limited only by the following claims.

What is claimed is:

1. A storage system adapted to be coupled to a plurality of host computers, said storage system comprising:
   a plurality of disk drives storing data from said host computers, said disk drives forming a plurality of logical units, said logical units having logical unit numbers; and
   a controller controlling read/write of data from/to said disk drives in response to access from said host computers to said logical units by using a map,
   wherein said map includes an identifier of a host group having some of said host computers and a plurality of virtual logical unit numbers, one or more of said virtual logical unit numbers being mapped to said identifier of said host group and each of said virtual logical unit numbers being a renumbered identifier of one of said logical unit numbers.

2. A storage system adapted to be coupled to a plurality of host computers, said storage system comprising:
   a plurality of disk drives storing data from said host computers, said disk drives forming a plurality of logical units, said logical units having logical unit numbers; and
   a controller having an access management map,
   wherein said access management map includes an identifier of a host group having some of said host computers and a plurality of virtual logical unit numbers, one or more of said virtual logical unit numbers being mapped to said identifier of said host group and each of said virtual logical unit numbers being a renumbered identifier of one of said logical unit numbers, said access management map being used to control access from said host group to said logical units.

3. The storage system according to claim 2, wherein said access management map permits mapping of different logical unit numbers to a same virtual logical unit number for different host groups.

4. The storage system according to claim 2, wherein said access management map does not permit mapping of different logical unit numbers to one host group at a same virtual logical unit number.

5. The storage system according to claim 2, wherein said virtual logical unit numbers allocated to each host group begin with 0, and wherein each of said virtual logical unit numbers is a renumbered identifier of one of said logical unit numbers.

6. The storage system according to claim 2, wherein said virtual logical unit numbers allocated to each host group begin with 0 and increment by 1, and wherein each of said virtual logical unit numbers is a renumbered identifier of one of said logical unit numbers.

7. The storage system according to claim 2,
wherein each of said virtual logical unit numbers can be specified by a user.

8. The storage system according to claim 2, wherein said host computers included in said host group are related to each other.

9. A storage system adapted to be coupled to a plurality of host computers, said storage system comprising:
a plurality of disk drives storing data from said host computers, said disk drives forming a plurality of logical units, said logical units having logical unit numbers; and
a controller having an access management table,
wherein said access management table includes an identifier of a host group having some of said host computers and a plurality of virtual logical unit numbers, one or more of said virtual logical unit numbers being mapped to said identifier of said host group and each of said virtual logical unit numbers being a renumbered identifier of one of said logical unit numbers, said access management table being used to control access from said host group to said logical units.

10. The storage system according to claim 9, wherein said access management table permits mapping of different logical unit numbers to a same virtual logical unit number for different host groups.

11. The storage system according to claim 9, wherein said access management table does not permit mapping of different logical unit numbers to one host group at a same virtual logical unit number.

12. The storage system according to claim 9, wherein said virtual logical unit numbers allocated to each host group begin with 0, and wherein each of said virtual logical unit numbers is a renumbered identifier of one of said logical unit numbers.

13. The storage system according to claim 9, wherein said virtual logical unit numbers allocated to each host group begin with 0 and increment by 1, and wherein each of said virtual logical unit numbers is a renumbered identifier of one of said logical unit numbers.

14. The storage system according to claim 9, wherein each of said virtual logical unit numbers can be specified by a user.

15. A storage system adapted to be coupled to a plurality of host computers, said storage system comprising:
a plurality of disk drives storing data from said host computers, said disk drives forming a plurality of logical units, said logical units having logical unit numbers; and
a controller controlling read/write of data from/to said disk drives in response to access from said host computers to said logical units by using an access management map,
wherein said access management map includes an identifier of a host group having some of said host computers and a plurality of virtual logical unit numbers, one or more of said virtual logical unit numbers being mapped to said identifier of said host group rind each of said virtual logical unit numbers being a renumbered identifier of one of said logical unit numbers.

16. The storage system according to claim 15, wherein said access management map permits mapping of different logical unit numbers to a same virtual logical unit number for different host groups.

17. The storage system according to claim 15, wherein said access management map does not permit mapping of different logical unit numbers to one host group at a same virtual logical unit number.

18. The storage system according to claim 15, wherein said virtual logical unit numbers allocated to each host group begin with 0, and wherein each of said virtual logical unit numbers is a renumbered identifier of one of said logical unit numbers.

19. The storage system according to claim 15, wherein said virtual logical unit numbers allocated to each host group begin with 0 and increment by 1, and wherein each of said virtual logical unit numbers is a renumbered identifier of one of said logical unit numbers.

20. The storage system according to claim 15, wherein each of said virtual logical unit numbers can be specified by a user.

21. A storage system adapted to be coupled to a plurality of host computers, said storage system comprising:
a plurality of disk drives storing data from said host computers, said disk drives forming a plurality of logical units, said logical units having logical unit numbers; and
a controller controlling read/write of data from/to said disk drives in response to accesses from said host computers to said logical units by using an access management table,
wherein said access management table includes an identifier of a host group having some of said host computers and a plurality of virtual logical unit numbers, one or more of said virtual logical unit numbers being mapped to said identifier of said host group and each of said virtual logical unit numbers being a renumbered identifier of one of said logical unit numbers.

22. The storage system according to claim 21, wherein said access management table permits mapping of different logical unit numbers to a same virtual logical unit number for different host groups.

23. The storage system according to claim 21, wherein said access management table does not permit mapping of different logical unit numbers to one host group at a same virtual logical unit number.

24. The storage system according to claim 21, wherein said virtual logical unit numbers allocated to each host group begin with 0, and wherein each of said virtual logical unit numbers is a renumbered identifier of one of said logical unit numbers.

25. The storage system according to claim 21, wherein said virtual logical unit numbers allocated to each host group begin with 0 and increment by 1, and wherein each of said virtual logical unit numbers is a renumbered identifier of one of said logical unit numbers.

26. The storage system according to claim 21, wherein each of said virtual logical unit numbers can be specified by a user.

27. The storage system according to claim 21, wherein said host computers included in said host group are related to each other.

28. A storage system adapted to be coupled to a plurality of host computers, said storage system comprising:
a plurality of disk drives storing data from said host computers, said disk drives forming a plurality of logical units, said logical units having logical unit numbers; and
a controller controlling read/write of data from/to said disk drives in response to accesses from said host computers to said logical units;

wherein said controller includes an access management map which includes a plurality of identifiers each of said identifiers corresponding to a host group having some of said host computers and a plurality of virtual logical unit numbers, each being a renumbered identifier of one of said logical unit numbers, wherein some of said virtual logical unit numbers allocated to each said host group begin with zero and others begin with a non-zero number, and wherein said controller controls access from said host group to said logical units in accordance with said access management map.

29. The storage system according to claim 28, wherein said access management map permits mapping of different logical unit numbers to a same virtual logical unit number for different host groups.

30. The storage system according to claim 28, wherein said access management map does not permit mapping of different logical unit numbers to one host group at a same virtual logical unit number.

31. The storage system according to claim 28, wherein some of said virtual logical unit numbers corresponding to said host group increment by 1.

32. The storage system according to claim 28, wherein each of said virtual logical unit numbers can be specified by a user.

33. A storage system adapted to be coupled to a plurality of host computers, said storage system comprising:

a plurality of disk drives storing data from said host computers, said disk drives forming a plurality of logical units, said logical units having logical unit numbers; and a controller controlling read/write of data from/to said disk drives in response to accesses from said host computers to said logical units;

wherein said controller includes an access management table which maps an identifier of a host group having some of said host computers and a plurality of virtual logical unit numbers, each being a renumbered identifier of one of said logical unit numbers, wherein said virtual logical unit numbers begin with a non-zero number, and wherein said controller controls access from said host group to said logical units in accordance with said access management table.

34. The storage system according to claim 33, wherein said access management table permits mapping of different logical unit numbers to a same virtual logical unit number for different host groups.

35. The storage system according to claim 33, wherein said access management table does not permit mapping of different logical unit numbers to one host group at a same virtual logical unit number.

36. The storage system according to claim 33, wherein said virtual logical unit numbers corresponding to said host group begin with said non-zero number and increment by 1.

37. The storage system according to claim 33, wherein each of said virtual logical unit numbers can be specified by a user.

* * * * *